(12) United States Patent
Huang et al.

(10) Patent No.: US 10,783,697 B2
(45) Date of Patent: Sep. 22, 2020

(54) SYSTEMS, METHODS, AND COMPUTER-READABLE MEDIA FOR ULTRA-HIGH RESOLUTION 3D IMAGING OF WHOLE CELLS

(71) Applicant: Yale University, New Haven, CT (US)

(72) Inventors: Fang Huang, West Lafayette, IN (US); Joerg Bewersdorf, Guilford, CT (US)

(73) Assignee: Yale University, New Haven, CT (US)

( * ) Notice: Subject to any disclaimer, the term of this patent is extended or adjusted under 35 U.S.C. 154(b) by 118 days.

(21) Appl. No.: 15/442,265

(22) Filed: Feb. 24, 2017

(65) Prior Publication Data

US 2017/0251191 A1 Aug. 31, 2017

Related U.S. Application Data

(60) Provisional application No. 62/300,751, filed on Feb. 26, 2016.

(51) Int. Cl.
*G01N 33/48* (2006.01)
*G06T 15/08* (2011.01)
*G01N 21/64* (2006.01)
*G02B 21/36* (2006.01)
*G02B 21/16* (2006.01)
*G02B 21/22* (2006.01)
*G06T 7/11* (2017.01)

(52) U.S. Cl.
CPC .......... *G06T 15/08* (2013.01); *G01N 21/6458* (2013.01); *G02B 21/16* (2013.01); *G02B 21/22* (2013.01); *G02B 21/367* (2013.01); *G06T 7/11* (2017.01)

(58) Field of Classification Search
None
See application file for complete search history.

(56) References Cited

U.S. PATENT DOCUMENTS

| | | | |
|---|---|---|---|
| 5,671,085 A * | 9/1997 | Gustafsson | G02B 21/22 359/368 |
| 6,570,705 B2 | 5/2003 | Bewersdorf et al. | |
| 6,737,635 B2 | 5/2004 | Engelhardt et al. | |
| 6,798,569 B2 | 9/2004 | Bewersdorf et al. | |
| 6,891,670 B2 | 5/2005 | Gugel et al. | |
| 7,054,062 B2 | 5/2006 | Engelhardt et al. | |
| 7,224,824 B1 | 5/2007 | Kam et al. | |
| 7,333,207 B2 | 2/2008 | Bewersdorf et al. | |
| 7,485,875 B2 | 2/2009 | Wolleschensky et al. | |
| 7,535,012 B2 | 5/2009 | Betzig et al. | |
| 7,538,893 B2 | 5/2009 | Hell et al. | |
| 7,626,694 B2 | 12/2009 | Betzig et al. | |
| 7,626,695 B2 | 12/2009 | Betzig et al. | |
| 7,626,703 B2 | 12/2009 | Betzig et al. | |
| 7,709,809 B2 | 5/2010 | Kempe | |
| 7,710,563 B2 | 5/2010 | Betzig et al. | |
| 7,742,226 B2 | 6/2010 | Bewersdorf et al. | |
| 7,772,569 B2 | 8/2010 | Bewersdorf et al. | |
| 7,776,613 B2 | 8/2010 | Zhuang et al. | |
| 7,782,457 B2 | 8/2010 | Betzig et al. | |
| 7,803,634 B2 | 9/2010 | Klimov et al. | |
| 7,863,585 B2 | 1/2011 | Hell et al. | |
| 7,864,314 B2 | 1/2011 | Betzig et al. | |
| 7,880,149 B2 | 2/2011 | Bewersdorf et al. | |
| 7,880,150 B2 | 2/2011 | Hell et al. | |
| 8,084,754 B2 | 12/2011 | Hell et al. | |
| 8,110,405 B2 | 2/2012 | Klimov et al. | |
| 8,174,692 B2 | 5/2012 | Hell et al. | |
| 8,217,992 B2 | 7/2012 | Bewersdorf et al. | |
| 8,334,143 B2 | 12/2012 | Klimov et al. | |
| 8,462,336 B2 | 6/2013 | Betzig et al. | |
| 8,564,792 B2 | 10/2013 | Zhuang et al. | |
| 8,599,376 B2 | 12/2013 | Betzig et al. | |

(Continued)

FOREIGN PATENT DOCUMENTS

| WO | WO 2009/146016 A1 | 12/2009 |
|---|---|---|
| WO | WO 2013/090360 A2 | 6/2013 |

(Continued)

OTHER PUBLICATIONS

Bazaraa, M. S., J. J. Goode, and R. L. Rardin. "A finite steepest-ascent algorithm for maximizing piecewise-linear concave functions." Journal of Optimization Theory and Applications 25.3 (1978): 437-442.*

Kim, Soo-Kyun, and Chang-Hun Kim. "Finding ridges and valleys in a discrete surface using a modified MLS approximation." Computer-Aided Design 38.2 (2006): 173-180.*

Allen, J. R., et al., "Practical considerations for single molecule localization microscopy", Microscopy:advances in scientific research and education (A. Mendez-Vilas, Ed.), 732-740, 2014.

Antonello, J., et al., "Modal-based phase retrieval for adaptive optics", Journal of the Optical Society of America, 32:6, 1160-1170, Jun. 2015.

Aquino, D., et al., "Two-color nanoscopy of three-dimensional volumes by 4Pi detection of stochastically switched fluorophores", Nature Methods, 8:4, 353-361, Apr. 2011.

(Continued)

*Primary Examiner* — Anna Skibinsky
(74) *Attorney, Agent, or Firm* — Saul Ewing Arnstein & Lehr LLP; Kathryn Doyle; Brian R. Landry

(57) ABSTRACT

One aspect of the invention provides a method for drift correction to correct a 3D point collection dataset to compensate for drift over time. The method includes: (a) separating the 3D dataset into n segments, wherein n>1; (b) for each of the n segments, reconstructing a volume image as a 3D histogram in which a count for each voxel in the histogram equals a number of localization estimates falling within the voxel; (c) performing 3D cross-correlation between pairs of the n segments; (d) identifying a correlation peak in a result of the 3D cross-correlation to determine a shift distance between pairs of the n segments; (e) solving an overdetermined system of shift distances to determine independent shifts; and (f) offsetting positions from a plurality of segments in the 3D point collection dataset with the independent shifts calculated in step (e) to correct for drift.

7 Claims, 21 Drawing Sheets

(56) References Cited

U.S. PATENT DOCUMENTS

| | | | |
|---|---|---|---|
| 8,610,086 B2 | 12/2013 | Wolleschensky et al. | |
| 8,617,827 B2 | 12/2013 | Hell et al. | |
| 8,668,872 B2 | 3/2014 | Klimov et al. | |
| 8,994,807 B2 | 3/2015 | Bennett et al. | |
| 9,028,757 B2 | 5/2015 | Klimov et al. | |
| 9,077,975 B2 | 7/2015 | Zhuang et al. | |
| 2002/0105722 A1 | 8/2002 | Bewersdorf et al. | |
| 2008/0158551 A1 | 7/2008 | Hess | |
| 2009/0242801 A1 | 10/2009 | Engelhardt et al. | |
| 2010/0283842 A1* | 11/2010 | Guissin | G02B 13/06 348/68 |
| 2011/0025831 A1 | 2/2011 | Bewersdorf et al. | |
| 2012/0287244 A1 | 11/2012 | Bennett et al. | |
| 2013/0147916 A1 | 6/2013 | Bennett et al. | |
| 2014/0042340 A1 | 2/2014 | Hell | |
| 2015/0226950 A1 | 8/2015 | Booth et al. | |
| 2016/0041099 A1 | 2/2016 | Parthasarathy et al. | |
| 2016/0044255 A1 | 2/2016 | Bewersdorf et al. | |
| 2016/0047798 A1 | 2/2016 | Hell et al. | |
| 2016/0095752 A1* | 4/2016 | Srinivasan | A61F 9/00825 606/6 |

FOREIGN PATENT DOCUMENTS

| | | |
|---|---|---|
| WO | WO 2014/196854 A1 | 12/2014 |
| WO | WO 2015/117115 A1 | 8/2015 |

OTHER PUBLICATIONS

Booth, M. J., "Adaptive optical microscopy: the ongoing quest for a perfect image", Light: Science & Applications, 1-7, 2014.

Booth, M., et al., "Aberrations and adaptive optics in super-resolution microscopy", Microscopy, 1-11, 2015.

Brown, T. A., et al., "Superresolution Fluorescence Imaging of Mitochondrial Nucleoids Reveals Their Spatial Range, Limits, and Membrane Interaction", Molecular and Cellular Biology, 31:24, Dec. 2011.

Burke, D. et al., "Adaptive optics for single molecule switching nanoscopy", Conference on Lasers and Electro-Optics Europe, Technical Digest, Aug. 2015.

Burke, D., et al., "Adaptive Optics for Superresolution Single Molecule Switching Microscopy" Light Science Applications, 3 e165, 2014.

Burke, D., et al., "Adaptive optics correction of specimen-induced aberrations in single-molecule switching microscopy", Optica, 2:2, 177-185, Feb. 2015.

Hamamatsu, "Video-speed Super-resolution Microscopy", http://thelivingimage.hamamatsu.com/exciting-advances-push-the-limits-of . . . , downloaded Apr. 2015.

Hartwich, T., "Development and Characterization of Single-Molecule Switching Nanoscopy Approaches for Deeper and Faster Imaging", Dissertation submitted to the Combined Faculties for the Natural Sciences and for Mathematics of the Ruperto-Carola University of Heidelberg, Germany for the degree of Doctor of Natural Sciences, Dec. 2012.

Hell, S. W., "NanoBiophotonics—4Pi Microscopy", https://nanobiophotonics.mpibpc.mpg.de//research/methods/4Pi.html, downloaded Apr. 2015.

Hell, S. W., "The 2015 super-resolution microscopy roadmap", J. Phys. D: Appl. Phys. 48, 1-35, 2015.

Huang, F., et al., "Video-rate nanoscopy using sCMOS camera-specific single-molecule localization algorithms", Nature Methods, 10:7, 653-661, Jul. 2013.

Kanchanawong, P., et al., "Advances in Light-based Imaging of Three-Dimensional Cellular Ultrastructure", Curr Opin Cell Biol, 24(1): 125-133, Feb. 2012.

Lin, Y., et al., "Quantifying and Optimizing Single-Molecule Switching Nanoscopy at High Speeds", PLOS One, 1-20, May 2015.

Patton, B. R., et al., "Is phase-mask alignment aberrating your STED microscope?", Methods Appl. Fluoresc. 3, 2015.

Sahl, S. J., "[labmembers] Today—4:15pm—Joerg Bewersdorf—Advances in Optical Nanoscopy of Living Cells", http://snf.stanford.edu/pipermail/labmembers/2014-February/005799.html, Feb. 19, 2014.

Shtengel, G., et al., "Interferometric fluorescent super-resolution microscopy resolves 3D cellular ultrastructure", PNAS, 105:9, 3125-3130, Mar. 2009.

Wikipedia, Babinet-Soleil Compensator, https://en.wikipedia.org/wiki/Babinet-Soleil_compensator, downloaded Feb. 26, 2016.

Wikipedia, Deformable mirror, http://en.wikipedia.org/wiki/Deformable_mirror, downloaded Apr. 28, 2015.

Wikipedia, Transformation matrix, https://en.wikipedia.org/wiki/Transformation_matrix#Affine_transformations, downloaded Jan. 29, 2016.

* cited by examiner

SYSTEMS, METHODS, AND COMPUTER-READABLE MEDIA FOR ULTRA-HIGH RESOLUTION 3D IMAGING OF WHOLE CELLS

CROSS-REFERENCE TO RELATED APPLICATION

This application claims priority under 35 U.S.C. § 119(e) to U.S. Provisional Patent Application Ser. No. 62/300,751, filed Feb. 26, 2016. The entire content of this application is hereby incorporated by reference herein.

BACKGROUND OF THE INVENTION

Major advances in cell biology are tightly linked to innovations in microscopy. However, the wave nature of light restricts the resolution of conventional light microscopy to ~200 nm, making details of subcellular structures and protein assemblies unresolvable. The advent of super-resolution fluorescence microscopy, or nanoscopy, techniques such as stimulated emission depletion (STED) and single-molecule switching nanoscopy (SMSN) has extended the application range of fluorescence microscopy beyond the diffraction limit, achieving up to 10-fold improvement in resolution.

SUMMARY OF THE INVENTION

One aspect of the invention provides a method including: (a) calculating a metric m that changes its value depending on axial positions of single molecule emission events in a plurality of single-molecule emission events, each event including an interference phase $\varphi_0$, an x and y coordinate, and a signal distribution that depends on an axial position of the single-molecule emission event; (b) creating a histogram or scatter plot of interference phase $\varphi_0$ over metric m; (c) applying a piece-wise monotonic path-finding algorithm to the histogram or scatter plot to identify a piece-wise monotonic path with respect to metric m; (d) unwrapping the piece-wise monotonic path into a monotonic path by adding an integer multiplication of $2\pi$ in different sections of the piece-wise monotonic path such that the piece-wise monotonic path is converted into a single-piece monotonic path; and (e) for each of a plurality of the single-molecule emission events: (i) identifying a point $P_{path}$ on the single-piece monotonic path having a minimum distance to a point $(m, \varphi_0)$ corresponding to the event; (ii) identifying an integer multiplication of a associated with point $P_{path}$ during the unwrapping step; (iii) adding the integer multiplication of $2\pi$ to the point $(m, \varphi_0)$ corresponding to the event to obtain $(m, \varphi)$; and (iv) determining an axial position of the single-molecule emission event using $\varphi$.

This aspect can have a variety of embodiments. Step (e)(iv) can further include multiplying $\varphi$ by a distance that describes a period of the single molecule emission interference pattern. In one embodiment, metric $$m = \frac{\sigma_x^3}{\sigma_y} - \frac{\sigma_y^3}{\sigma_x}.$$

The histogram or scatter plot can be a two-dimensional histogram or scatter plot. The piece-wise monotonic path-finding algorithm can be a piece-wise monotonic ridge-finding algorithm.

Another aspect of the invention provides a non-transitory computer readable medium containing program instructions executable by a processor. The computer readable medium includes program instructions to implement the methods described herein.

Another aspect of the invention provides an imaging instrument including: a first opposing objective lens; a second opposing objective lens; a camera in optical communication with the opposing objective lenses; a beam combiner positioned along both a first optical path between a first optical path between the first opposing objective lens and a second optical path between a second optical path between the second opposing objective lens and adapted and configured to combine the first optical path the second optical path; and a controller programmed to receive a plurality of images from the camera and implement the methods described herein.

Another aspect of the invention provides a method for drift correction to correct a 3D point collection dataset to compensate for drift over time. The method includes: (a) separating the 3D dataset into n segments, wherein n>1; (b) for each of the n segments, reconstructing a volume image as a 3D histogram in which a count for each voxel in the histogram equals a number of localization estimates falling within the voxel; (c) performing 3D cross-correlation between pairs of the n segments; (d) identifying a correlation peak in a result of the 3D cross-correlation to determine a shift distance between pairs of the n segments; (e) solving an overdetermined system of shift distances to determine independent shifts; and (f) offsetting positions from a plurality of segments in the 3D point collection dataset with the independent shifts calculated in step (e) to correct for drift.

This aspect of the invention can have a variety of embodiments. Step (e) can further include: (i) identifying least-squares solutions for the overdetermined system of shift distances that minimize an overall error; (ii) substituting the least-squares solutions back into the overdetermined system to identify residue errors for individual equations within the overdetermined system; (iii) removing equations having residue errors exceeding a threshold; and (iv) repeating substeps (i)-(iii) until: none of the individual equations within the overdetermined system yields an error larger than the threshold or the overdetermined system equations are no longer at full rank.

The pairs can be adjacent pairs. The pairs can be partially overlapping pairs.

Another aspect of the invention provides a method for connecting a 3D point collection dataset obtained from different axial positions of a sample. The method includes: (a) for each of n optical sections, reconstructing a volume image as a 3D histogram in which a count for each voxel in the histogram equals a number of localization estimates falling within the voxel; (b) performing 3D cross-correlation between overlapping pairs of the n segments; (c) identifying a correlation peak in a 3D cross-correlation result to determine a shift distance between overlapping pairs of the n optical sections; (d) determining independent shifts between adjacent optical sections by solving an overdetermined system of shift distances from all of the overlapping pairs; and (e) offsetting positions from each of the n optical section within the 3D point collection dataset with their determined independent shifts.

This aspect of the invention can have a variety of embodiments. Step (d) can further include: (i) identifying least-square solutions for the overdetermined system of shift distances that minimize an overall error; (ii) substituting the least-square solutions back into the overdetermined system to identify residue errors for individual equations within the overdetermined system; (iii) removing equations having residue errors exceeding a threshold; and (iv) repeating substeps (i)-(iii) until: none of the individual equations within the overdetermined system yields an error larger than the threshold or the overdetermined system equations are no longer at full rank.

Another aspect of the invention provides an imaging instrument including: a first opposing objective lens; a second opposing objective lens; a camera in optical communication with the opposing objective lenses; a beam combiner positioned along both a first optical path between a first optical path between the first opposing objective lens and a second optical path between a second optical path between the second opposing objective lens and adapted and configured to combine the first optical path the second optical path; and a first wavefront-shaping device positioned along the first optical path between the first opposing objective lens and the beam combiner.

This aspect of the invention can have a variety of embodiments. The first wavefront-shaping device can be a first deformable mirror.

The imaging instrument can further include a second wavefront-shaping device positioned along the second optical path between the second opposing objective lens and the beam combiner. The second wavefront-shaping device can be a second deformable mirror.

The beam combiner can be a 50/50 beam combiner. The beam combiner can be a 49/51 beam combiner.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

TABLE 1

| Element | Description | Element | Description |
|---|---|---|---|
| L1-L5 | Lenses | OBJ | Objective |
| QWP | Quarter-Wave Plate | DM | Dichromic Mirror |
| QBF | Quad-Band Bandpass Filter | Def. Mirror | Deformable Mirror |
| BS | Beam Splitter Cube | PBS | Polarizing Beam Splitter Cube |
| RA | Rectangular Aperture | | |

Figure 2:
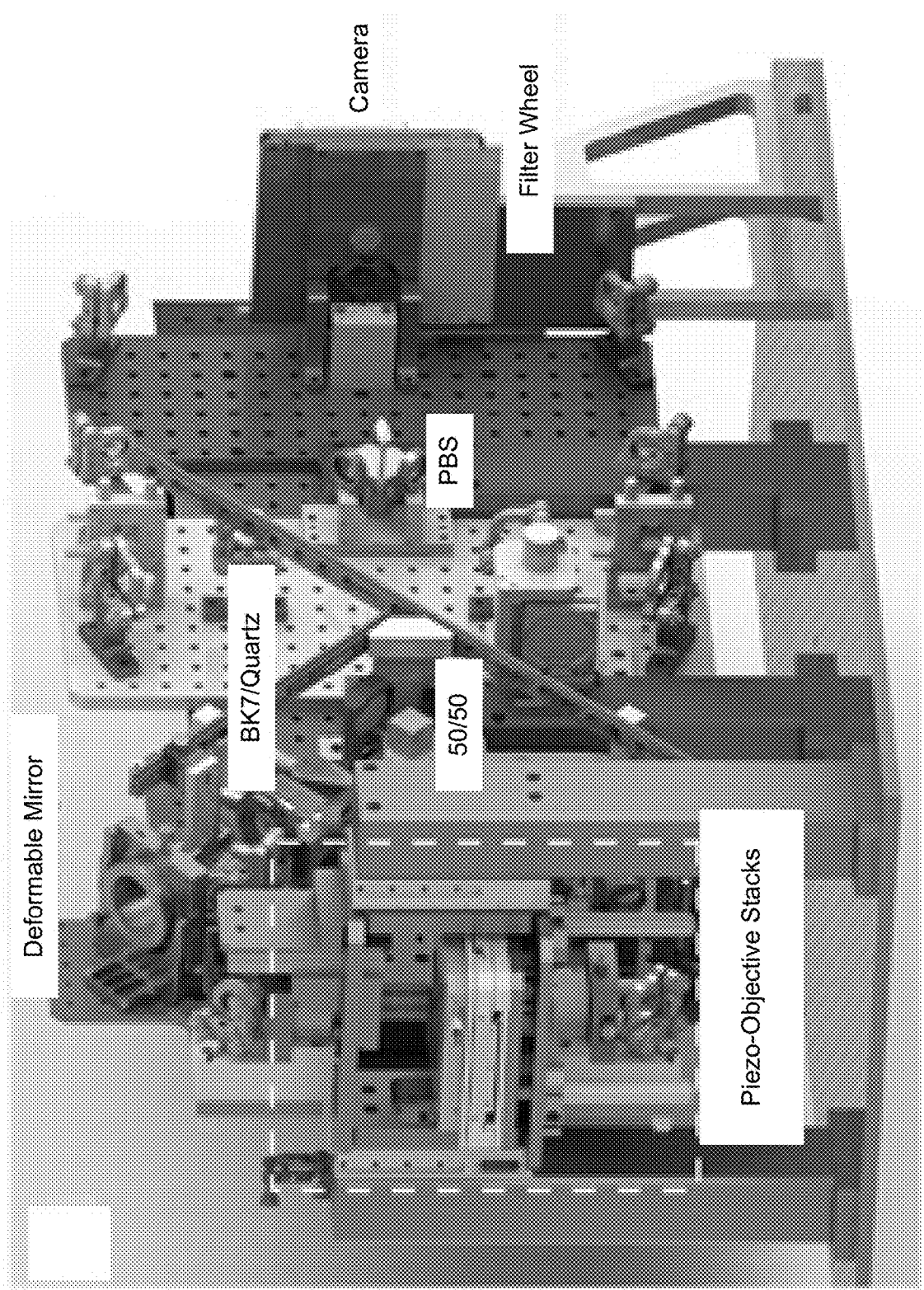

FIG. 2 is a CAD rendering of a W-4PiSMSN instrument according to an embodiment of the invention.

Figure 3:
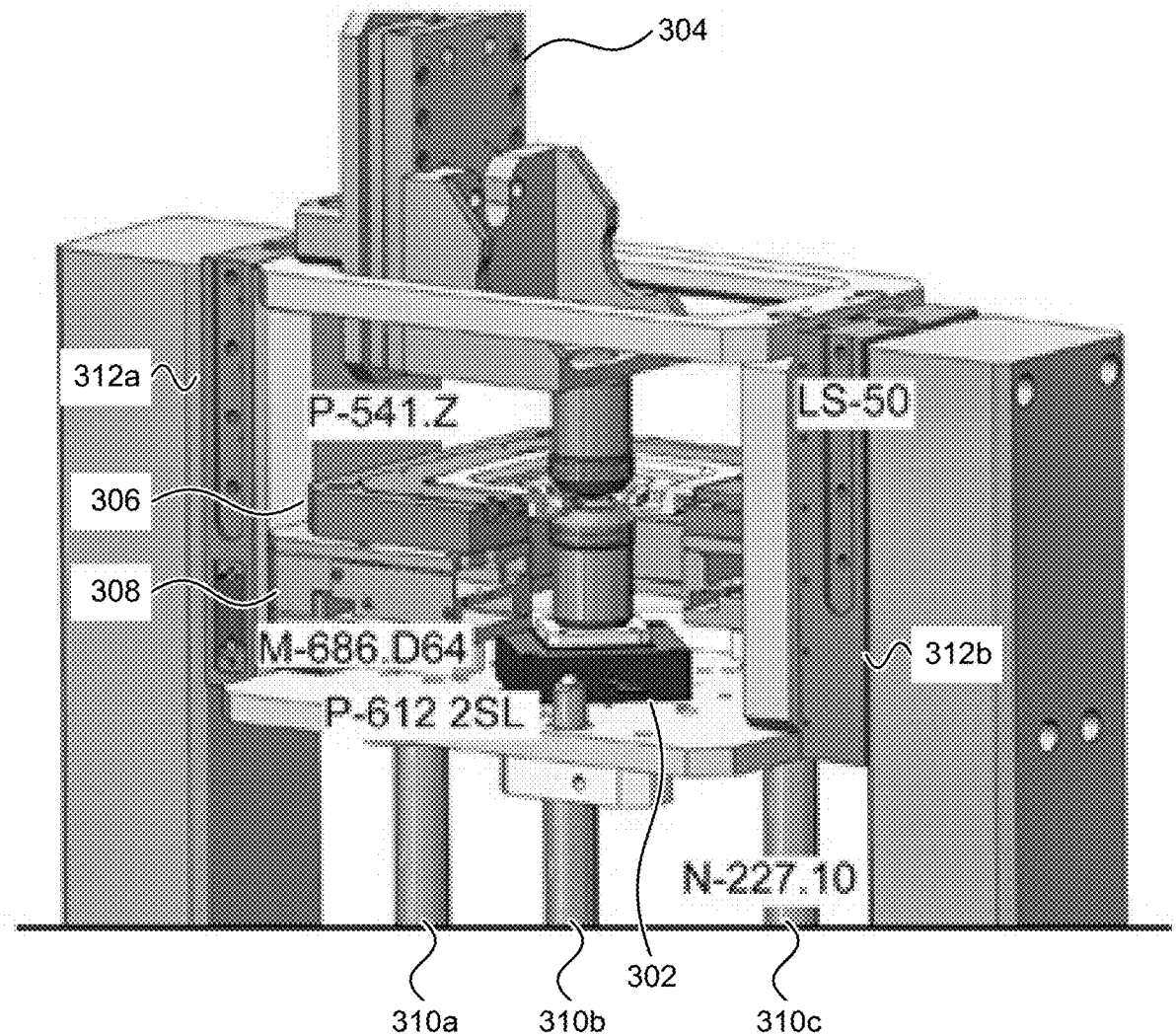

FIG. 3 is a CAD rendering of a piezo-objective stack. Further elements are detailed in Table 2 below.

TABLE 2

| Element | Description | Element | Description |
|---|---|---|---|
| 50/50 | 50/50 Beam Splitter Cube | PBS | Polarizing Beam Splitter Cube |

Figure 4:
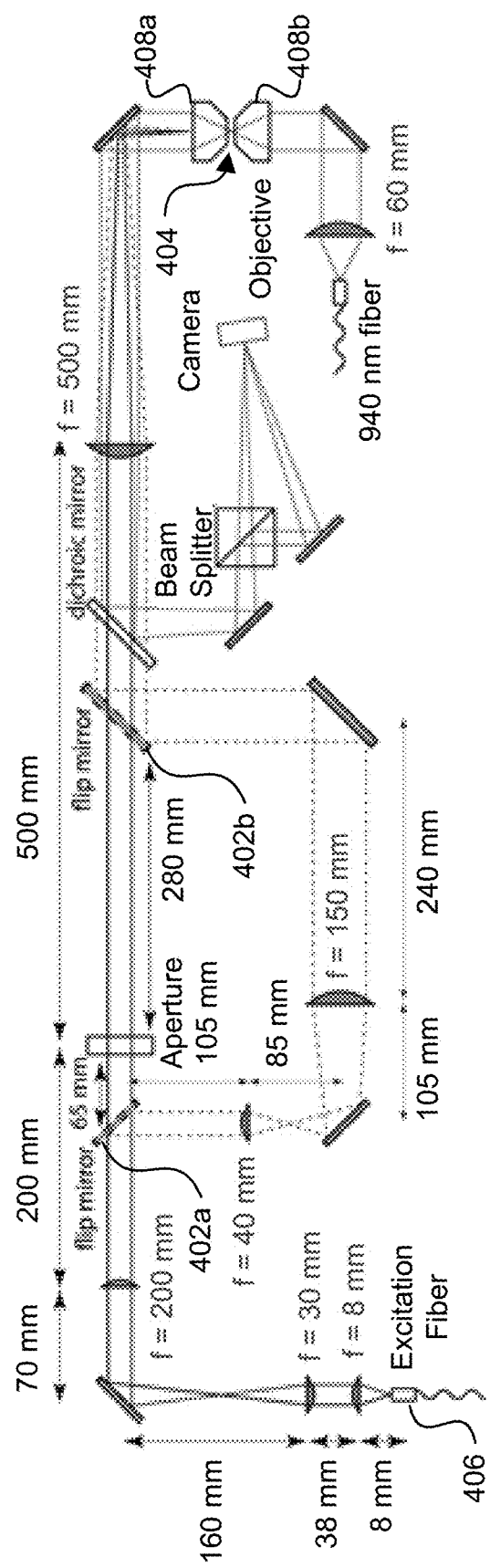

FIG. 4 depicts an excitation and diagnostic beam layout according to an embodiment of the invention. The excitation light from a polarization-maintaining single-mode fiber (solid blue line) was first collimated by an aspheric lens (f=8 mm) and further expanded ~6.6× to a size of ~12 mm. This beam passed through a pair of square apertures of ~5×5 mm that crops the center most uniform part of the beam. An f=500 mm lens focused the cropped beam to the back focal plane of the top objective, uniformly illuminating an ~18×18 µm area in the focal plane. For overview, a pair of flip mirrors routed the beam through an alternative path (dashed blue line) that bypassed the apertures. The beam was further expanded ~4× before being focused by the f=500 mm lens to the back focal plane of the objective and illuminated an ~100 µm diameter area in the focal plane. To lock the relative position of the two objectives, the laser light from a 940 nm diode laser (red solid line) was collimated by a lens to overfill the back focal plane of the bottom objective, which focused the light to a spot in the common focal plane. This focus was imaged by the top objective producing a collimated beam propagating in the opposite direction of the excitation light. The f=500 mm lens focused the beam through a biplane geometry to a camera.

Figure 5:
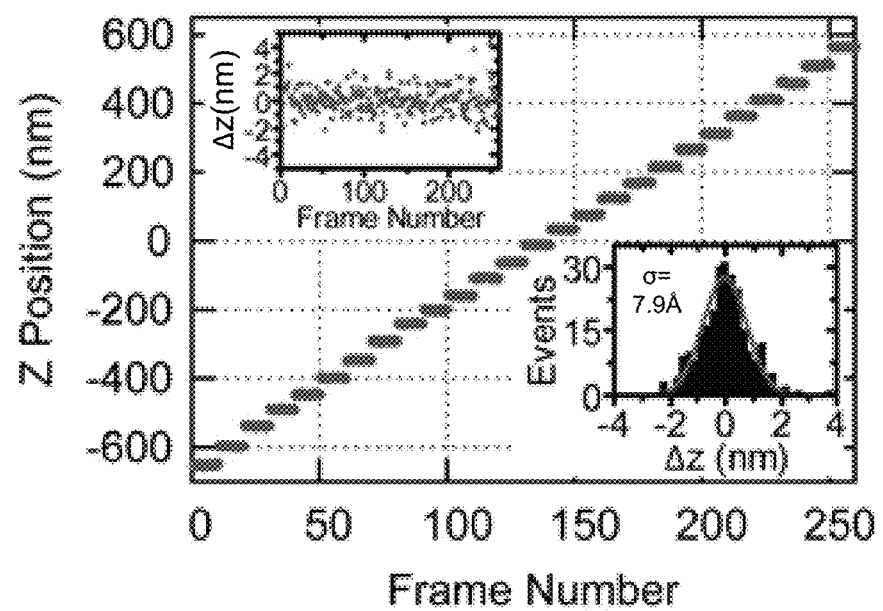

FIG. 5 depicts localization results of W-4PiSMSN of a fluorescent bead imaged with 50 nm steps over an axial range of 1.2 µm. Inserts show residual errors displayed for each step and in a histogram.

Figure 6:
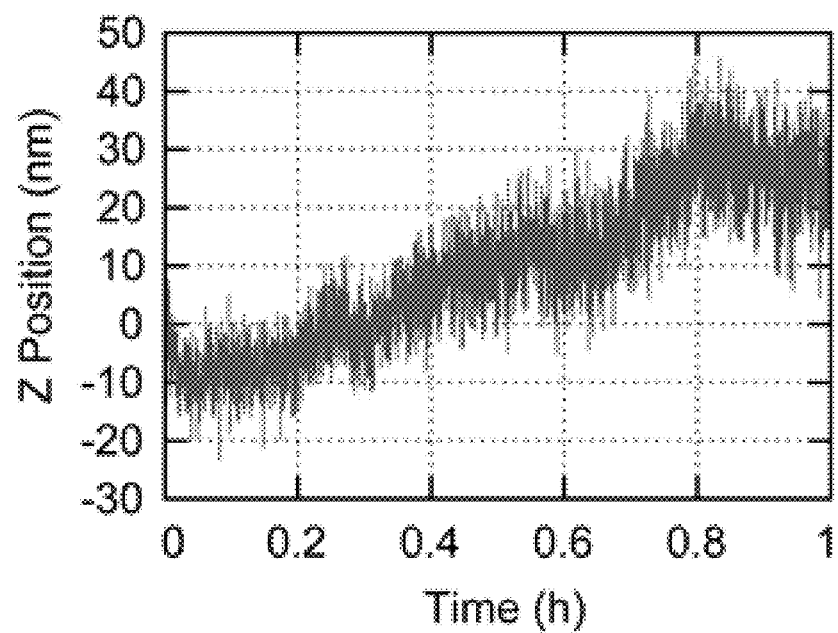

FIG. 6 depicts instrumental drift along the axial direction over 1 hour.

Figure 7:
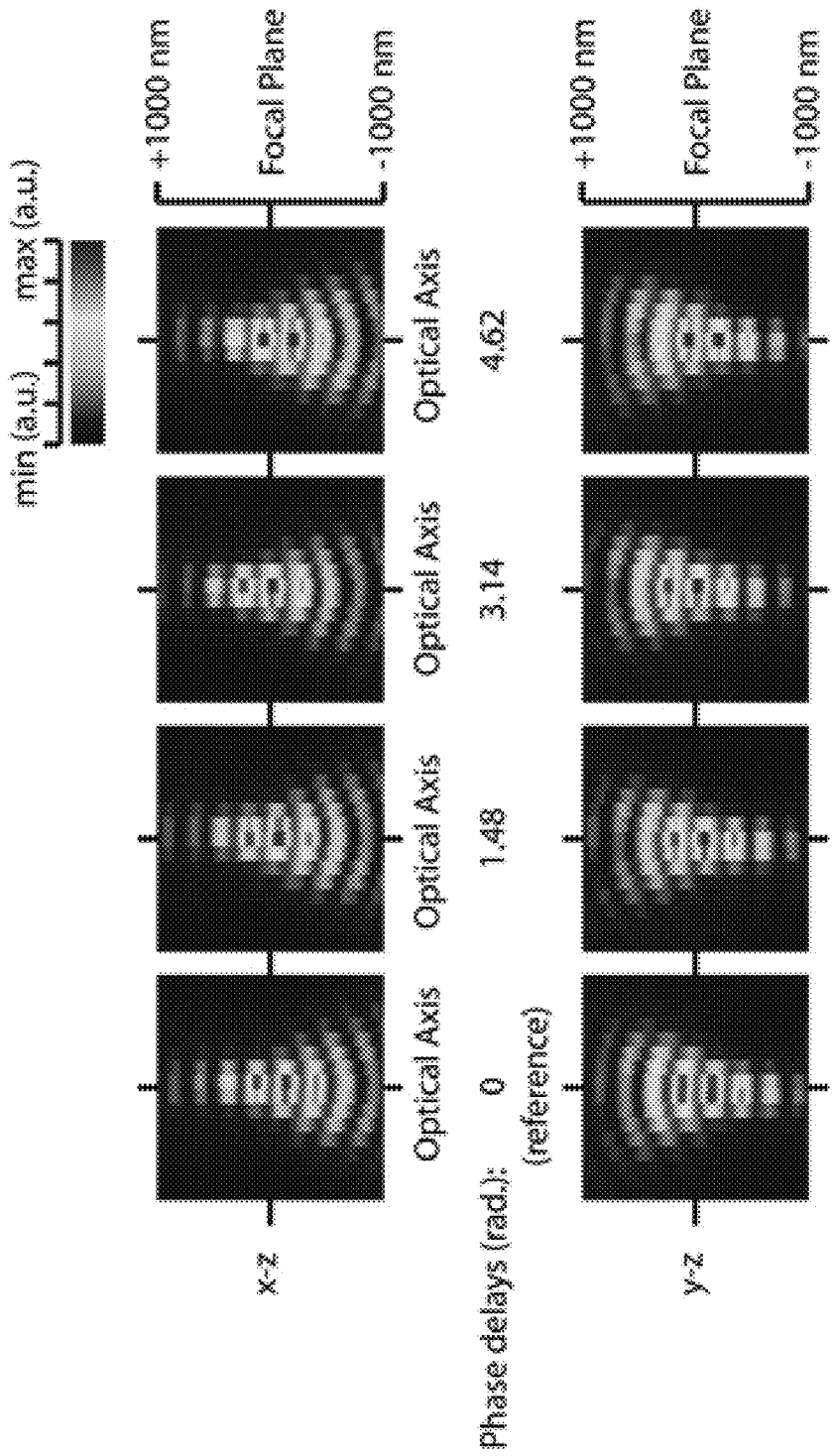

FIG. 7 depicts a W-4PiSMSN point spread function. Central x-z and y-z sections of W-4PiSMSN point-spread functions in the four images recorded by the sCMOS camera demonstrating interference and astigmatism introduced by the coherent detection cavity and deformable mirrors.

Figure 8A:
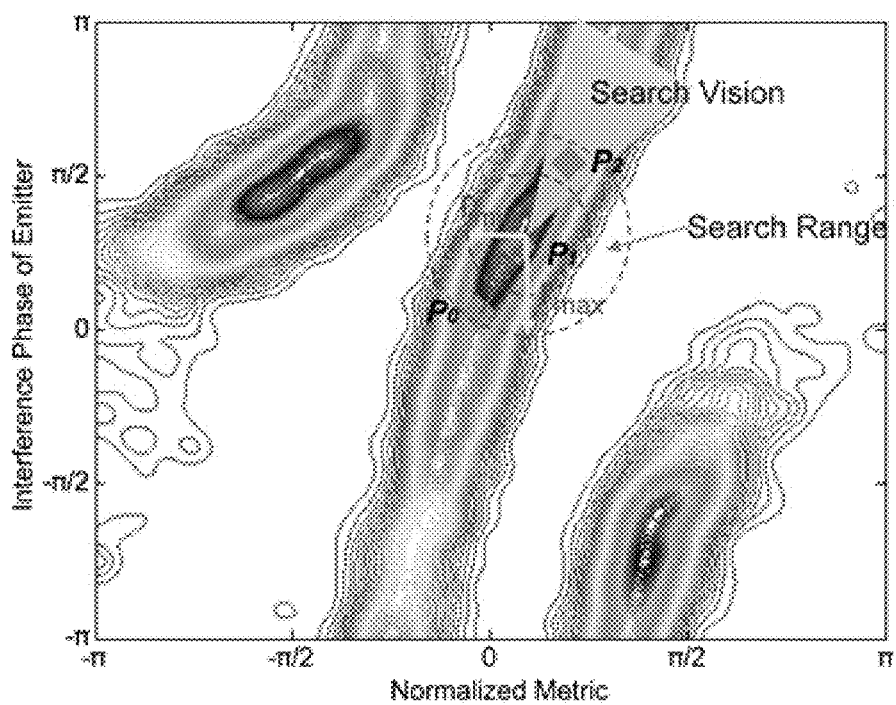
Figure 8B:
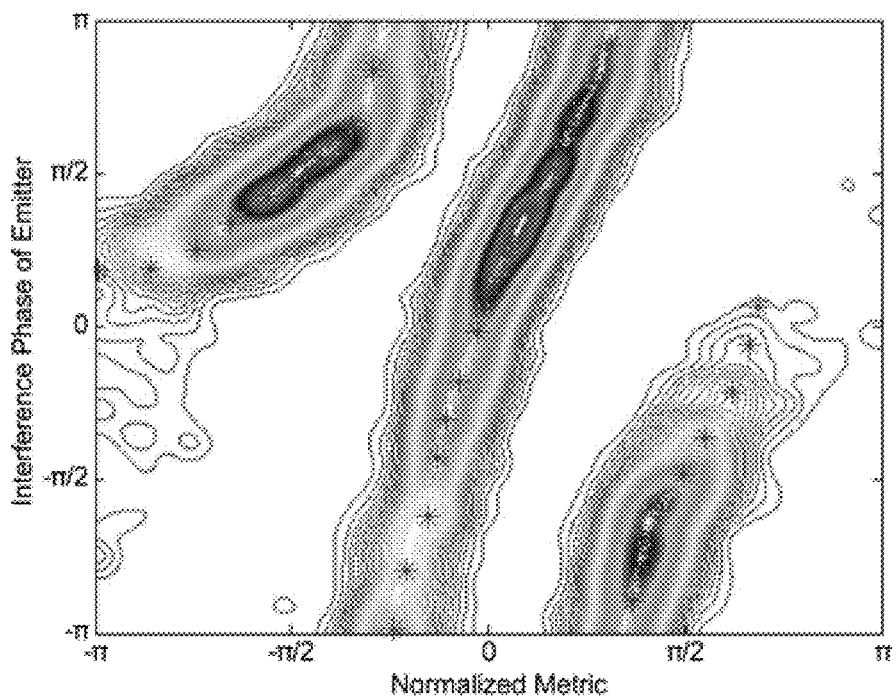

FIGS. 8A and 8B depict operation of a ridge-finding algorithm according to an embodiment of the invention. FIG. 8A depicts the ridge-finding algorithm concept including demonstrations of vision field, jump range, and directions of the current step. The contour plot of the 2D histogram was generated from single-molecule interference phase values and normalized metric values. FIG. 8B depicts the identified monotonic ridge of metric vs. phase curve in red stars before phase unwrapping.

Figure 9:
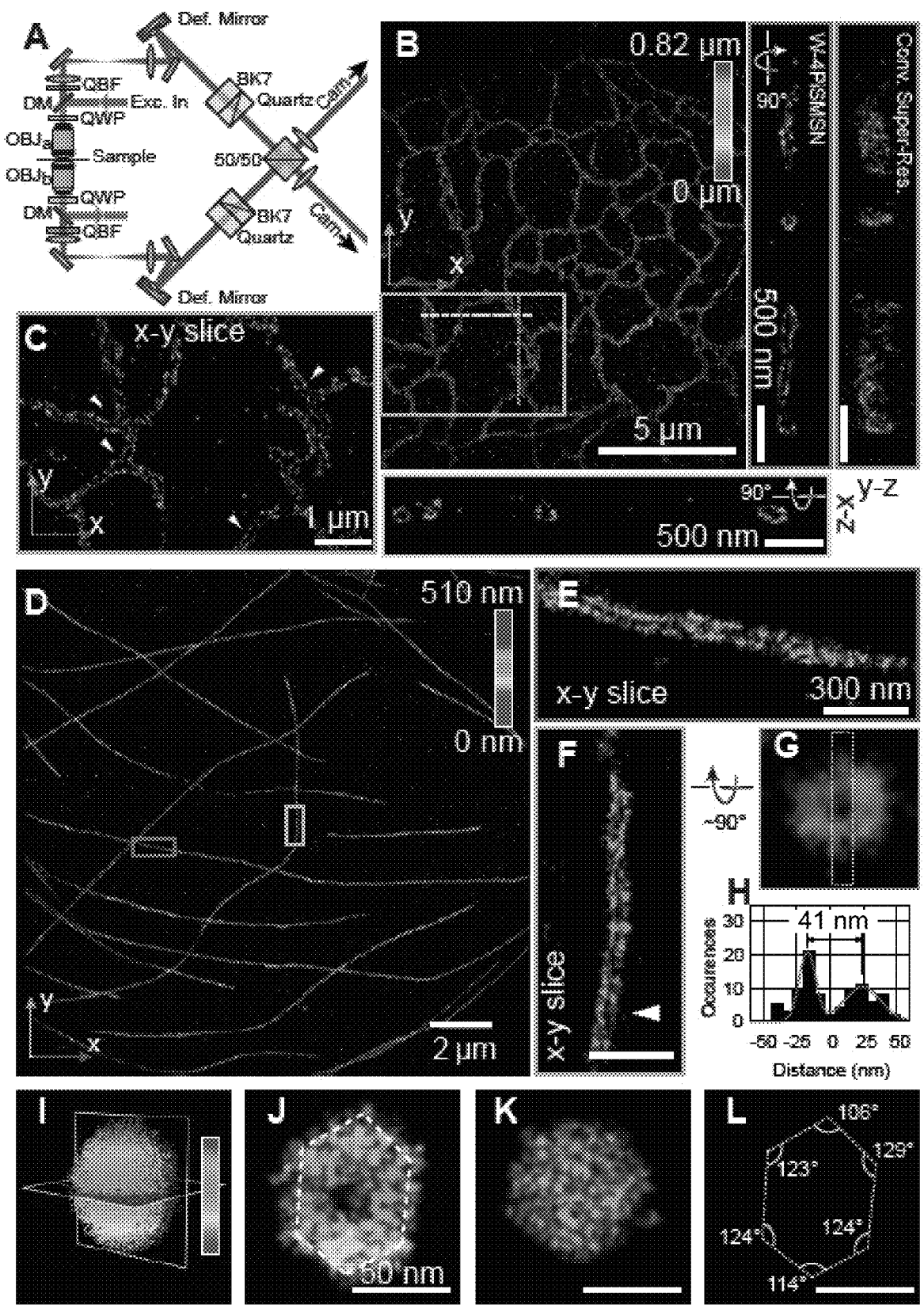

FIG. 9 depicts W-4PiSMSN design and resolution demonstrations with endoplasmic reticulum (ER), microtubules, and bacteriophages according to an embodiment of the invention. Panel A depicts a simplified optical diagram of a W-4PiSMSN instrument. Panel B provides an overview and cross-sections of the ER network in an immunolabeled COS-7 cell. Cross-sections of the W-4PiSMSN reconstruction show clearly separated membranes of the tubular structures, which cannot be resolved with conventional astigmatism-based nanoscopy (light blue frame). Panel C provides an x-y slice through the mid-section of the ER network shown in Panel B that highlights the distinct membrane contour of ER tubules with arrowheads. Panel D provides an overview of immunolabeled microtubules in a COS-7 cell. Panels E and F provide 20-nm thin x-y slices of segments shown in Panel D demonstrating that microtubules can be easily resolved as hollow cylinders in W-4PiSMSN. Panel G provides a look through a 120-nm long segment of the microtubule of Panel F. Panel H provides a histogram showing the number of localizations in a cross-section of the microtubule, white dotted box shown in Panel G. Panel I depicts a bacteriophage reconstructed from 115 averaged viral particles rendered in 3D. Panels J and K depict 5-nm thin optical slices through the averaged data set corresponding to the planes shown in Panel I. Panel L depicts the internal angle measurements of the hexagon shape identified from the viral capsid shown in Panel J.

Figure 10:
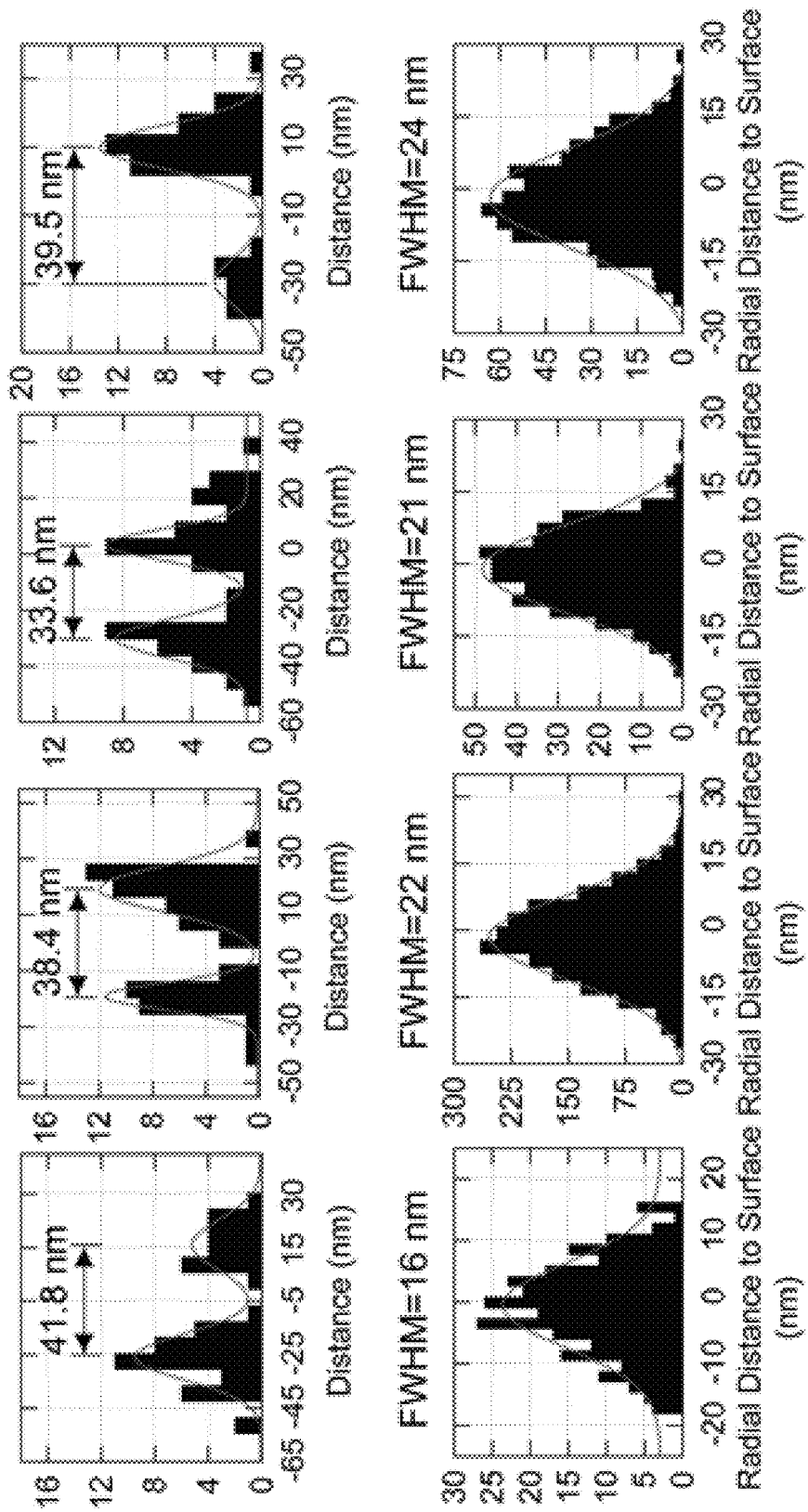

FIG. 10 depicts line profiles and residue plots. The top row provides four line profiles across x-y slices of microtubules of FIG. 9, Panels D-F. The bottom row depicts residual distances from single-molecule localizations to cylinder surface fit to four segments of the microtubule data.

Figure 11:
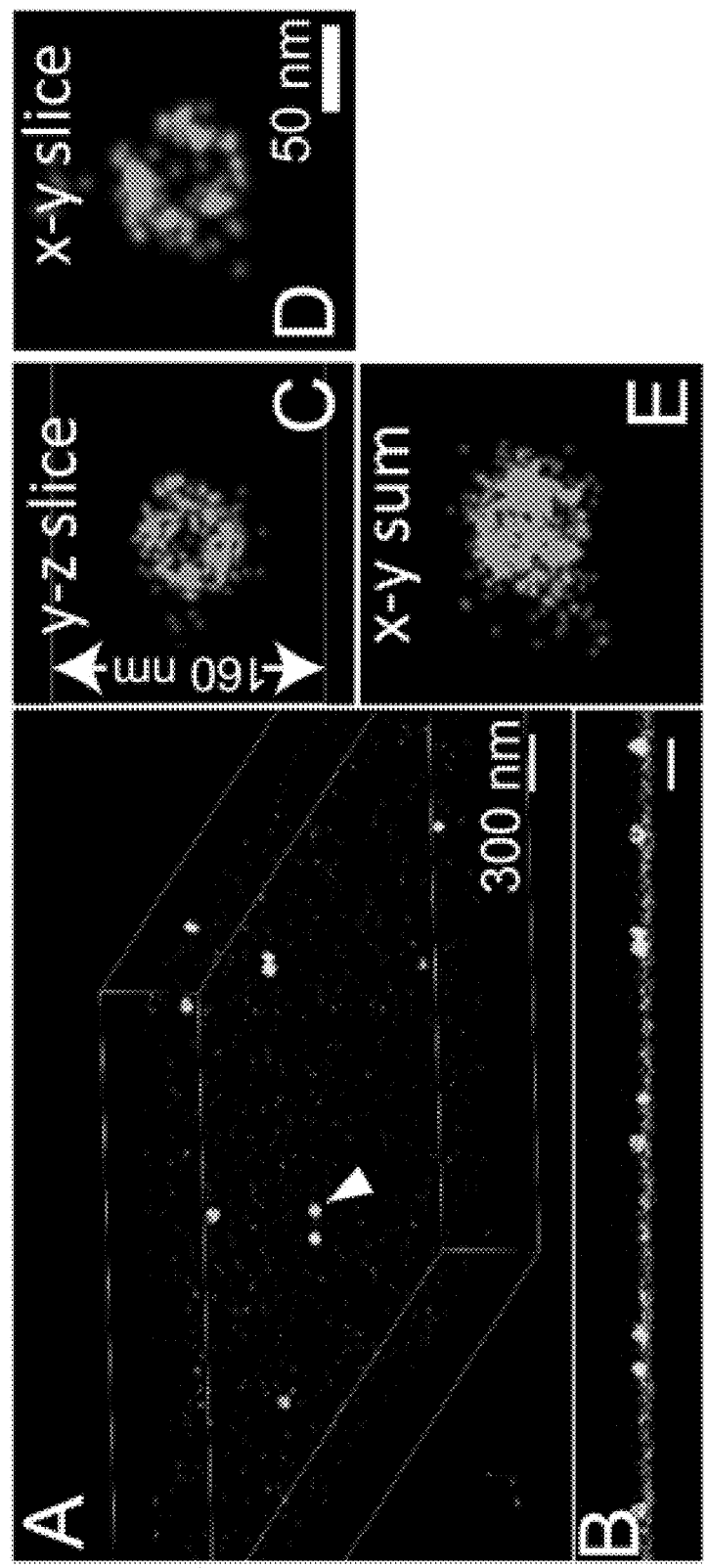

FIG. 11 provides an overview of an individual phage. Panel A provides an overview of ALEXA FLUOR®-647-labeled phages imaged by W-4PiSMSN. Panel B provides an x-z view of the entire sample showing coverslip surface and individual phages. Panels C-E provide cross-sections and projection of the isolated phage identified with an arrowhead in Panel A.

Figures 12A, 12B, 12C:
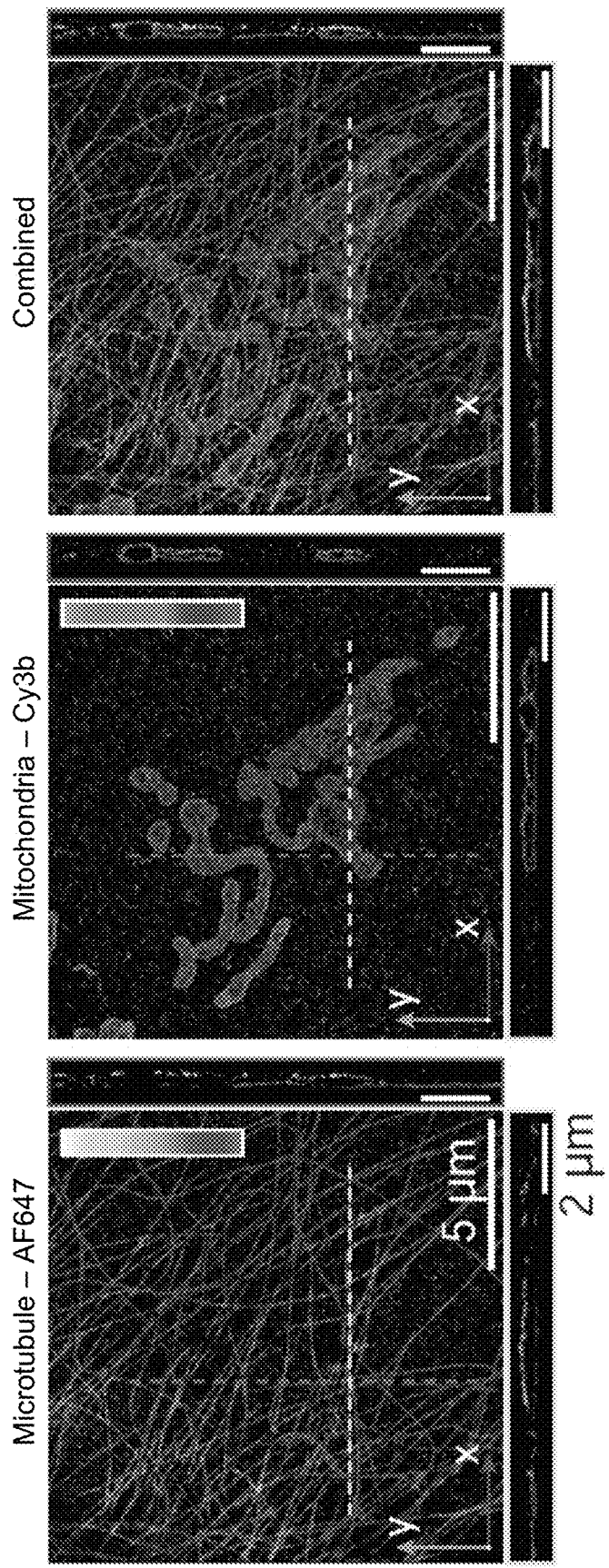

FIGS. 12A-12C depict two-color reconstruction of mitochondria and microtubules. FIGS. 12A and 12B depict W-4PiSMSN reconstruction of microtubules (FIG. 12A) and mitochondria (TOM20) (FIG. 12B) in a COS-7 cell immunolabeled with ALEXA FLUOR® 647 and Cy3b dyes, respectively. An x-y overview and x-z and y-z slices (yellow and magenta lines, respectively) are shown. In FIG. 12C, the combined two-color image reveals microtubules running adjacent to the mitochondria surface.

Figure 13A:
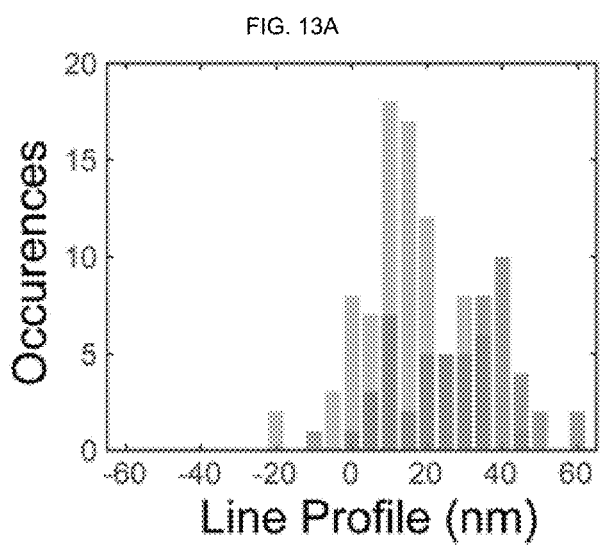
Figure 13B:
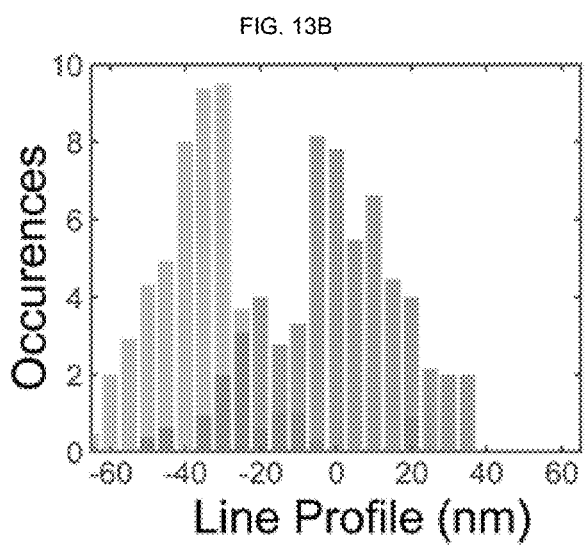
Figure 13C:

FIGS. 13A-13C provide examples of line profiles from FIGS. 12A-12C. FIGS. 13A and 13B provide examples of line profiles for the 2-color image of FIGS. 12A and 12B, respectively, integrated over widths of 200 nm. FIG. 13C depicts line profile positions for the image of FIG. 13C.

Figure 14:
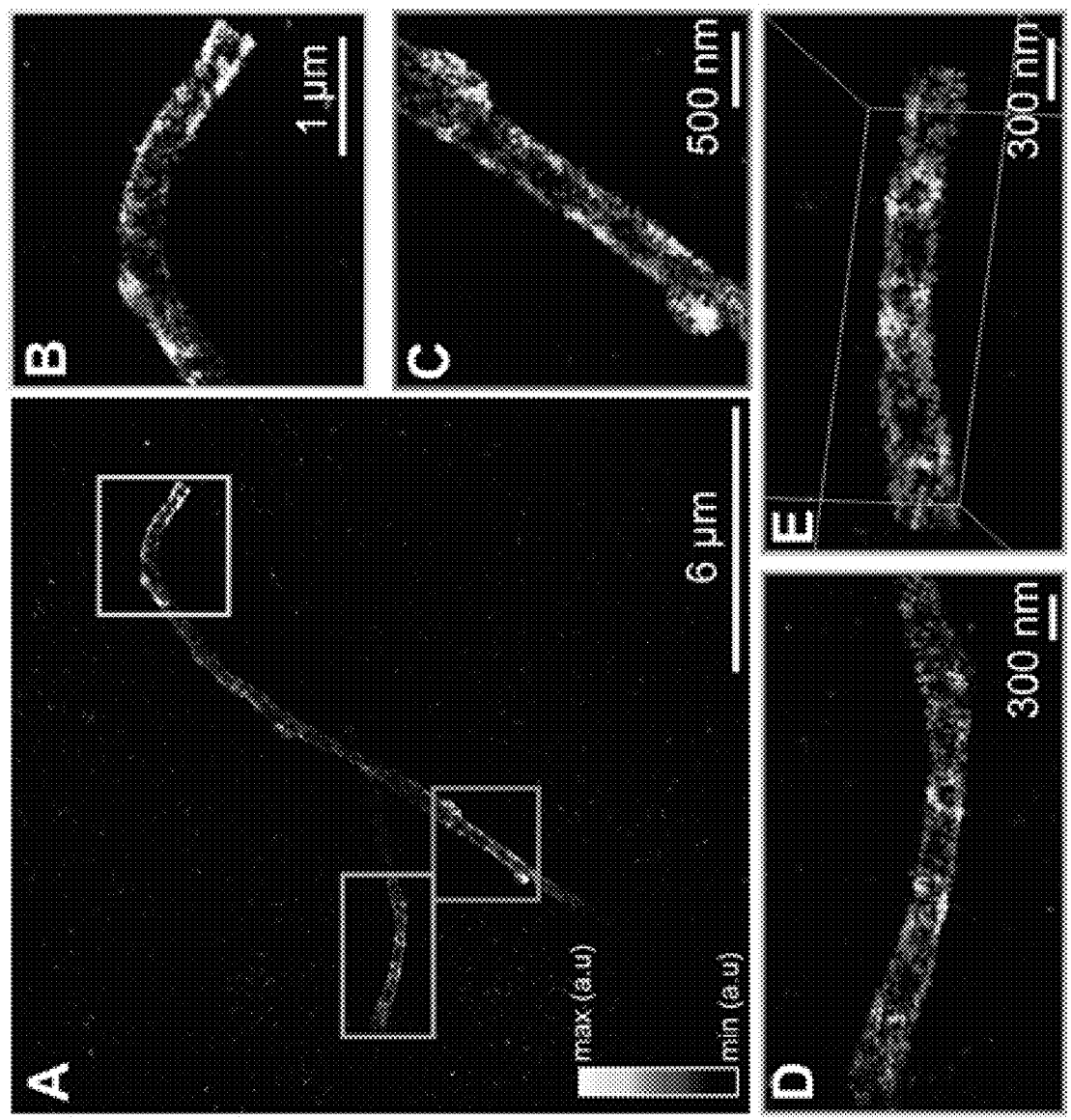

FIG. 14 depicts molecular density of the cilia membrane protein G protein-coupled receptor (GPCR) smoothened. Panel A provides an overview of cilia, color-coded by molecular density. Density was calculated by counting the number of localizations surrounding each localization within a 100-nm radius. Panels B-E provide zoomed and rotated views showing increased molecular density at the base of the cilia (Panel B), at positions with potential budding vesicles (Panel C), and in bands along the length of the cilia (Panels D and E), which suggest potential functional arrangements of SMO.

Figure 15:
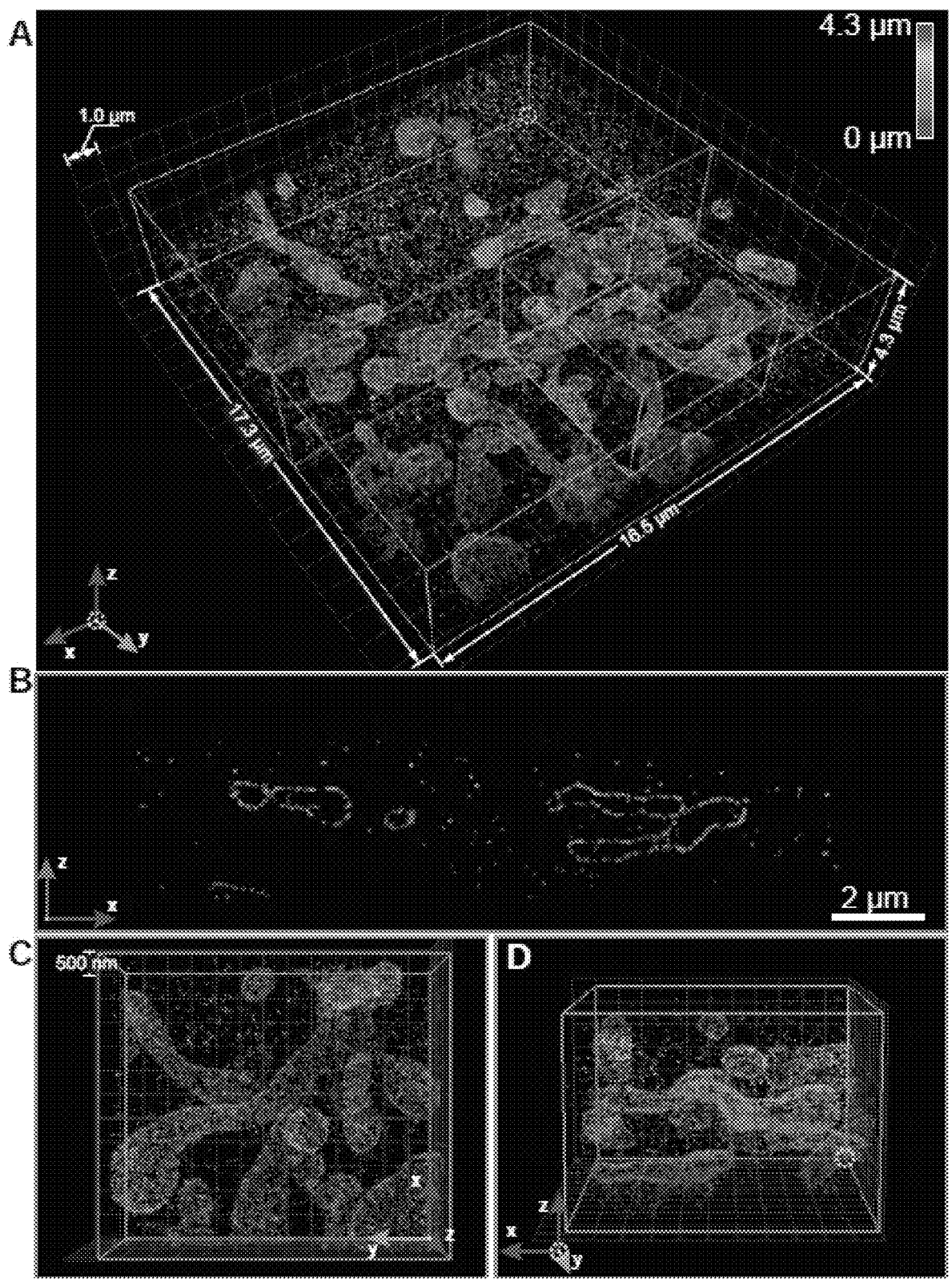

FIG. 15 depict W-4PiSMSN reconstruction of TOM20 on mitochondria in a COS-7 cell. Panel A provides an overview of the mitochondria network visualized by immunolabeling TOM20 with ALEXA FLUOR® 647 dye. The data set is assembled from 11 optical sections with 500 nm step sizes. Panel B depicts an x-z cross-section of the purple plane in Panel A showing the distribution of TOM20 on the outer mitochondrial membrane. Ghost images are completely negligible. Panels C and D provide different views of the orange box in Panel A showing the 3D arrangement of the organelle.

Figure 16:
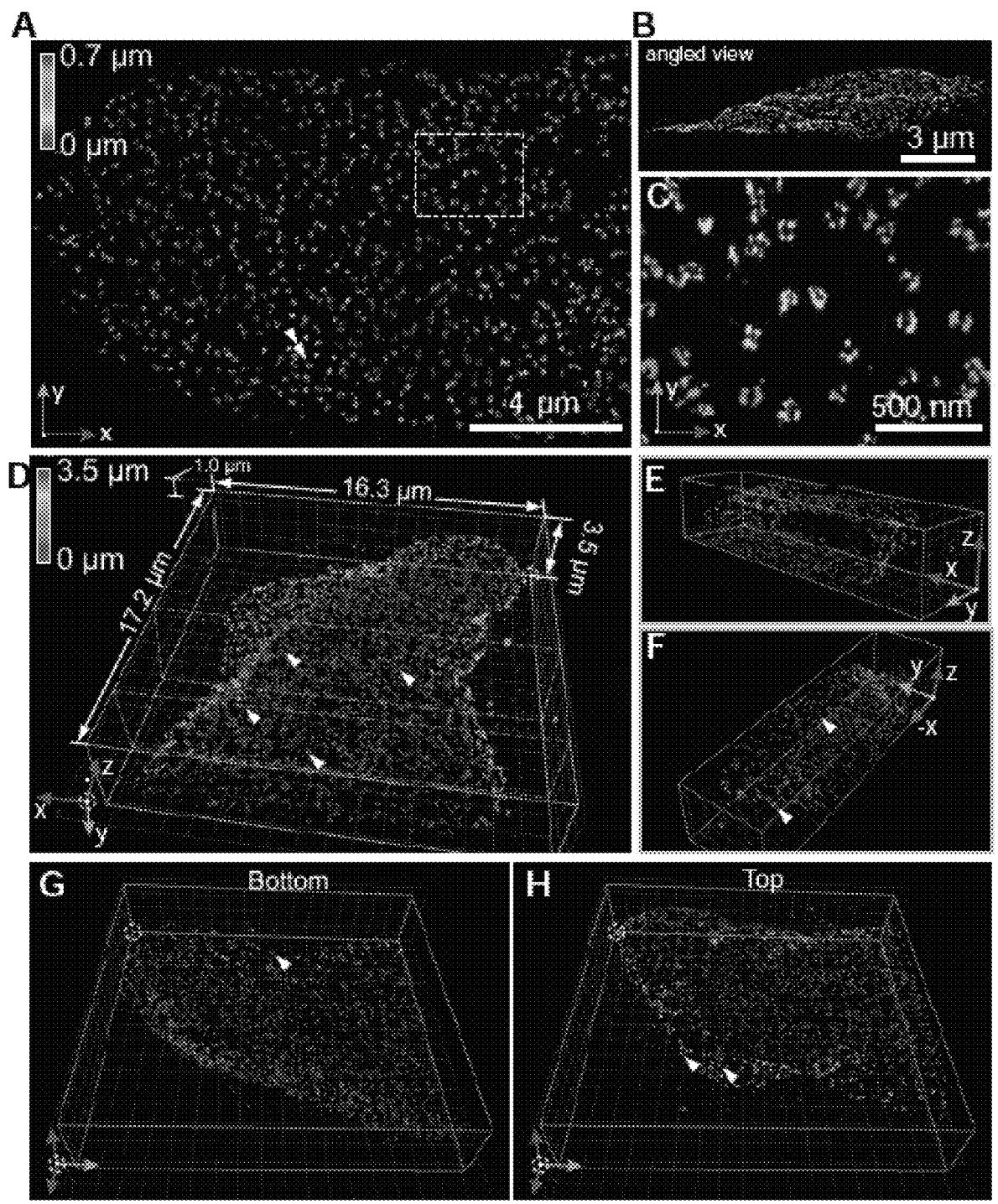

FIG. 16 depicts W-4PiSMSN imaging of nuclear pore complexes over the thickness of a cell nucleus. Nucleoporin 358 (Nup358) was immunolabeled with ALEXA FLUOR® 647 dye in hTERT-RPE1 cells. Panel A provides an overview of a region of the nucleus. The axial location of the nuclear pores is color-coded. Panel B provides measurements in both lateral and axial directions on an isolated spoke of a nuclear pore complex (NPC) shown by double arrowheads in Panel A. In Panel C, a subregion indicated by the dashed box in Panel A shows a zoomed-in view of multiple nuclear pores. Panel D provides an overview of a 3D reconstruction of the nucleus obtained by combining nine optical sections. Panels E and F provide a section of the reconstruction in Panel D confirming that the labeling is largely limited to the nuclear envelope. Panels G and H provide bottom and top half of the nucleus shown in Panel D. The images reveal ring-like nuclear pores on the top and the bottom nuclear envelope as well as at the sides of the nucleus (arrowheads).

Figure 17:
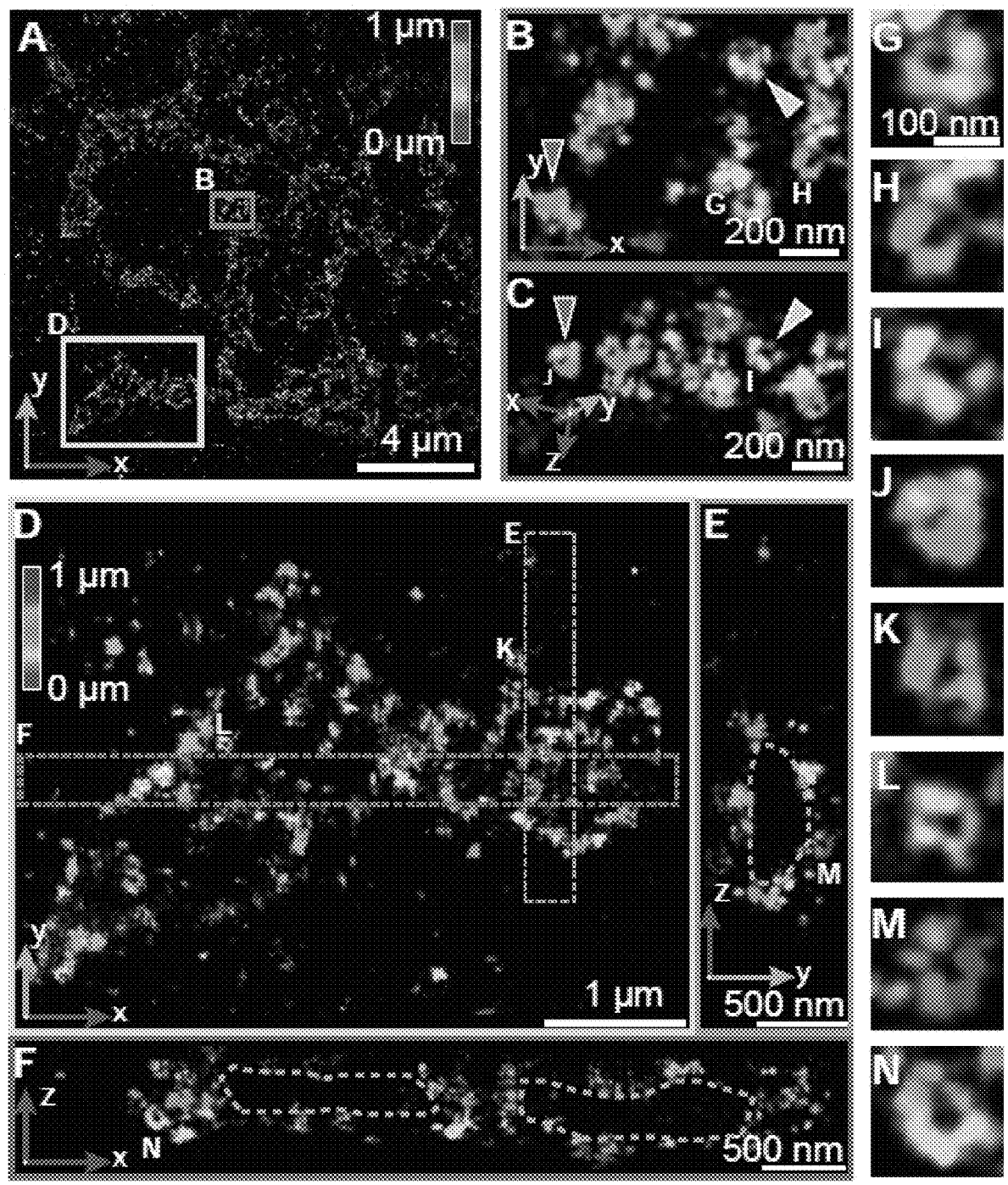

In FIG. 17, W-4PiSMSN resolves individual COPI-coated vesicles surrounding the Golgi apparatus. COPI complexes were immunolabeled with an antibody against coatomer subunit β' and imaged with ALEXA FLUOR® 647 dye in BSC-1 cells. Panel A provides an overview of a region of the Golgi apparatus, with axial location color-coded. Panels B and C depict the blue-boxed subregion indicated in Panel A from two different view angles showing that COPI often forms round and hollow sphere-like structures. Dark grey and light grey arrowheads indicate the same COPI structures. Panel D provides an x-y view of Golgi cisternae as indicated by the yellow box in Panel A. Panels E and F provide x-z and y-z views, respectively, of the boxed regions shown in Panel D showing that COPI surrounds an area presumably containing the Golgi cisternae. Panels G-N depict COPI vesicle structures found in Panels B-F shown at the same enlarged scale reveal circular structures.

Figure 18:
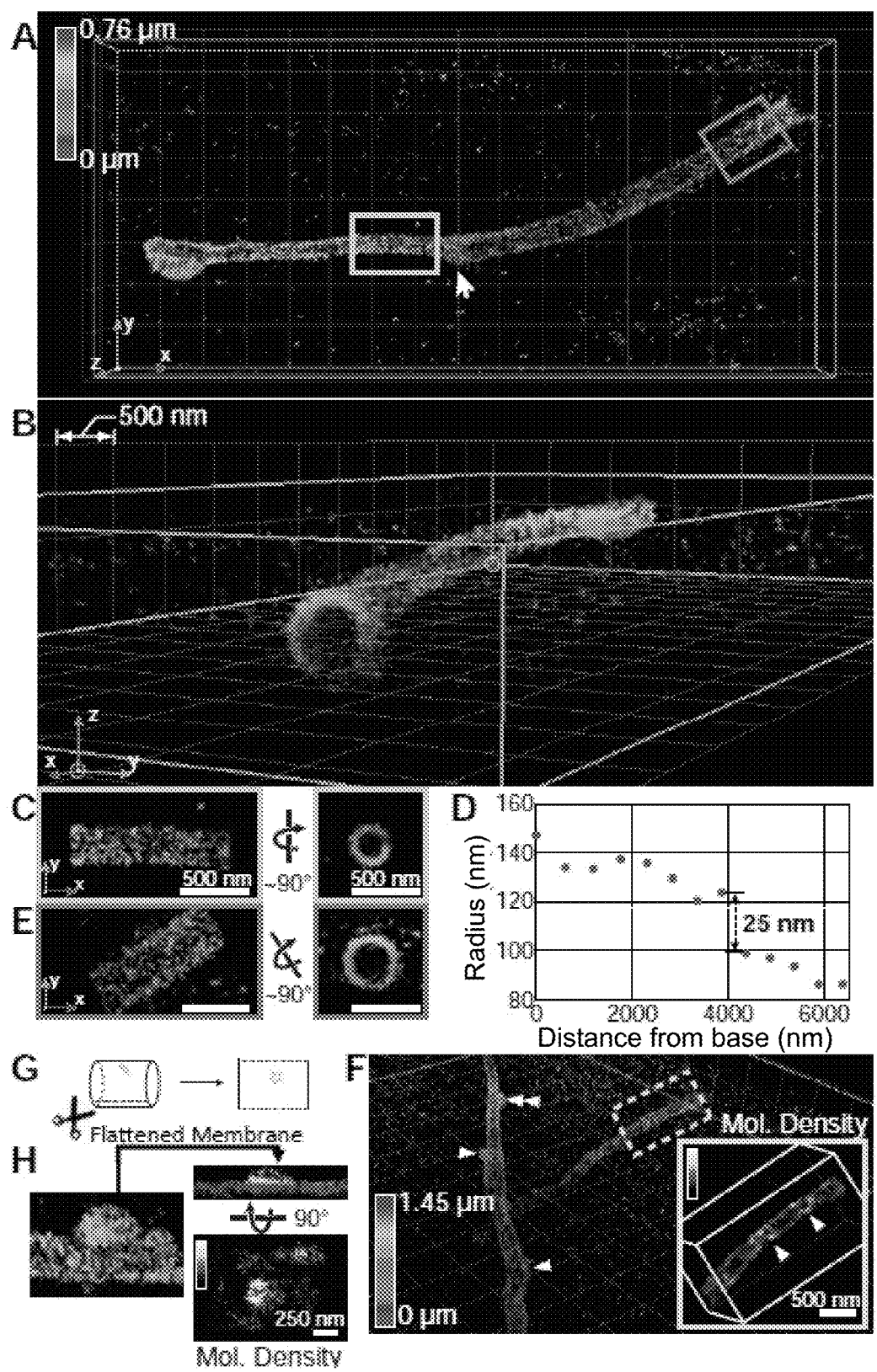

FIG. 18 depicts GPCR smoothened on a primary cilium. Panels A and B depict different views of a primary cilium on an hTERT-RPE1 cell expressing pH-SMO, which was immunolabeled with ALEXA FLUOR® 647 dye. Panels C and E provide views of sections close to the tip (Panel C) and the base (Panel E) as shown by the boxes in (A) that show the localization of pH-SMO to the cilium membrane. Panel D quantifies the radius of the cilium along its length and shows how the cilium becomes thinner towards its tip and reveals a characteristic 25 nm step in radius. Panel F provides an overview of a cilium in another region of the sample, showing vesicle-like buds on the ciliary membrane surface with arrowheads. The inset shows the local density of the boxed region, which suggests a helical stripe organization of pH-SMO (arrowheads in inset). Panels G and H depict that a bud-like profile shown in Panel F can be unwrapped, showing the height of the vesicle above the cilia membrane and the high molecular density of pH-SMO at the bud (Panel H).

Figure 19:
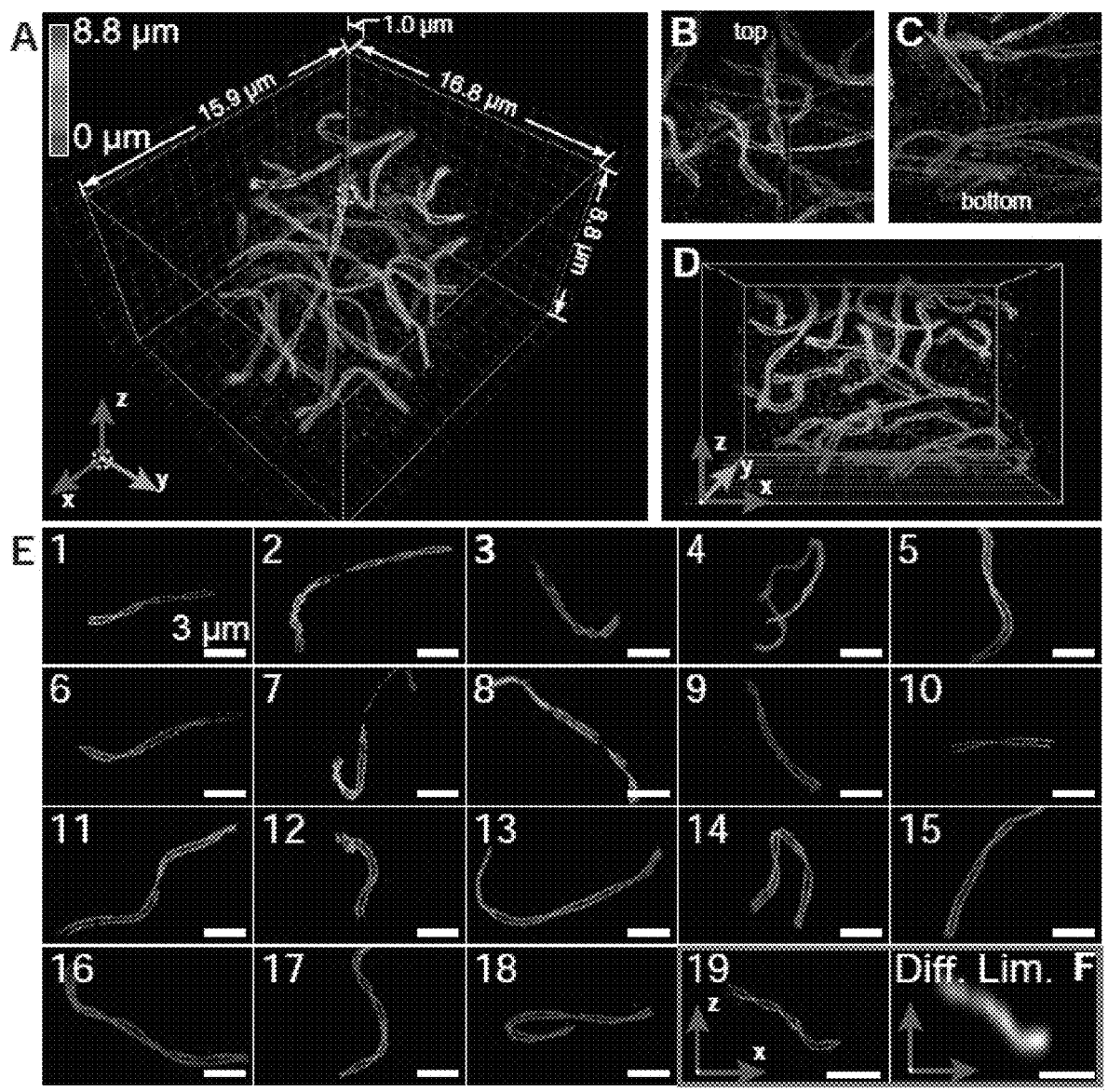

FIG. 19 depicts W-4PiSMSN imaging of the synaptonemal complexes in a whole mouse spermatocyte. Panel A provides an overview reconstructed from 21 optical sections. Lateral elements of the synaptonemal complex, spaced ~200 nm apart, are resolved throughout the ~9 µm depth of the spermatocyte at uniform resolution. Panels B and C provide different views from locations inside the spermatocyte centered on top and bottom regions of the data set. Panel D provides an x-z view of Panel A. Panel E depicts the computationally isolation of 19 synaptonemal complexes from an entire mouse spermatocyte haploid genome using a Euclidian distance-based clustering algorithm as discussed herein. Panel F provides a conventional image of the 19th synaptonemal complex in x-z view. Scale bars in Panels E(1)-E(19) and (F) are 2 µm.

Figure 20:
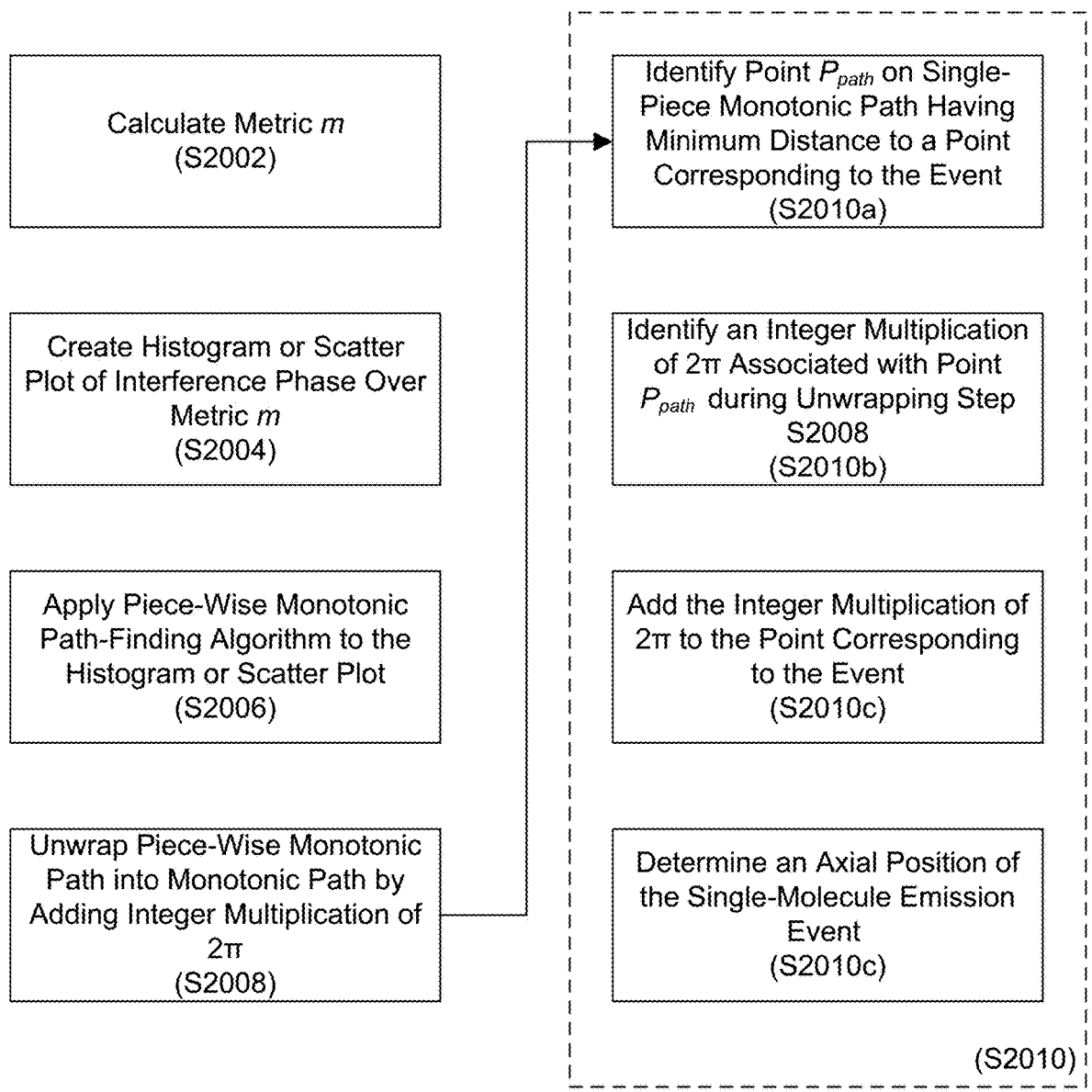

FIG. 20 depicts a method for axial localization based on monotonic metric and local ridge detection according to an embodiment of the invention.

Figure 21:
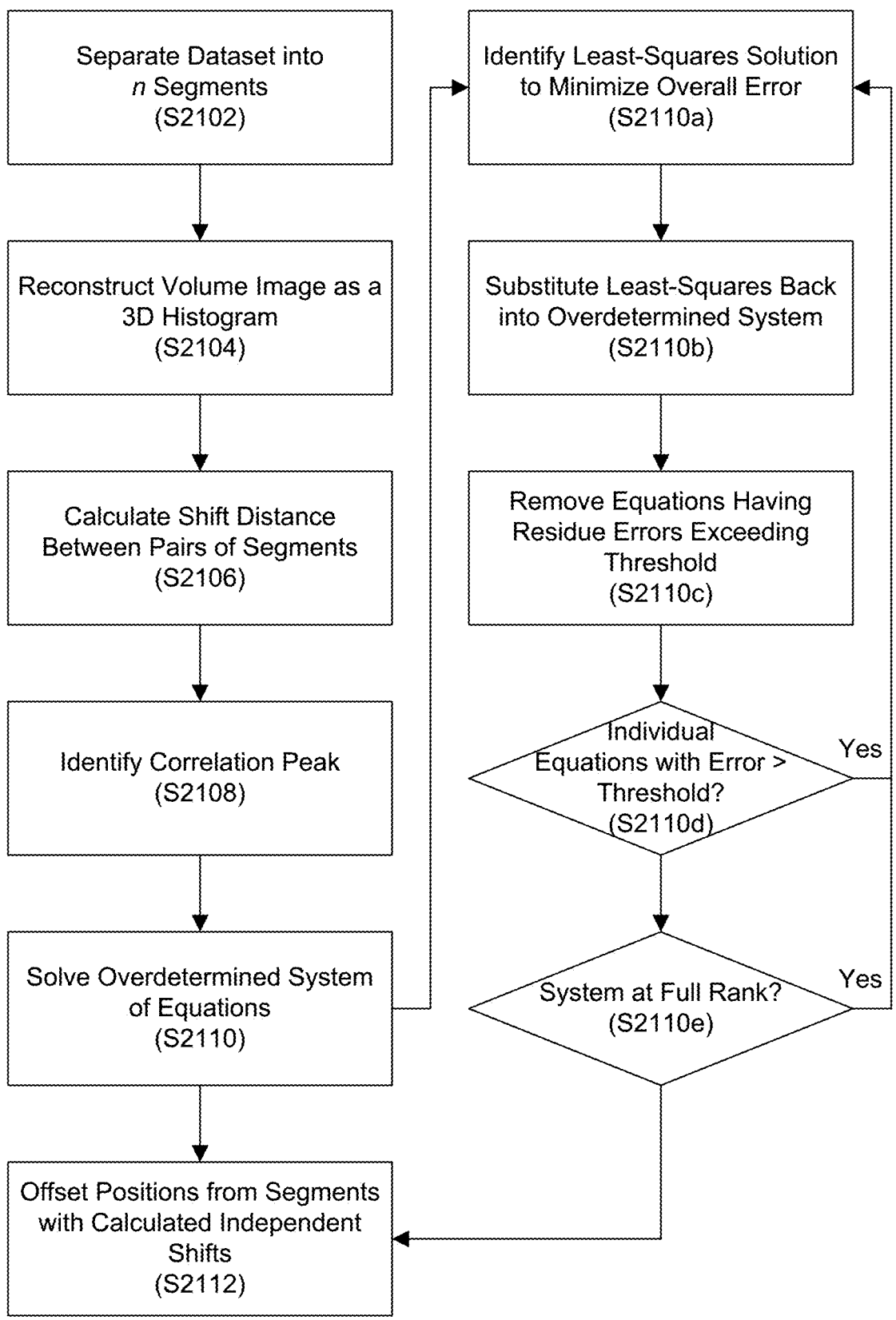

FIG. 21 depicts a method for 3D drift correction according to an embodiment of the invention.

Figure 22:
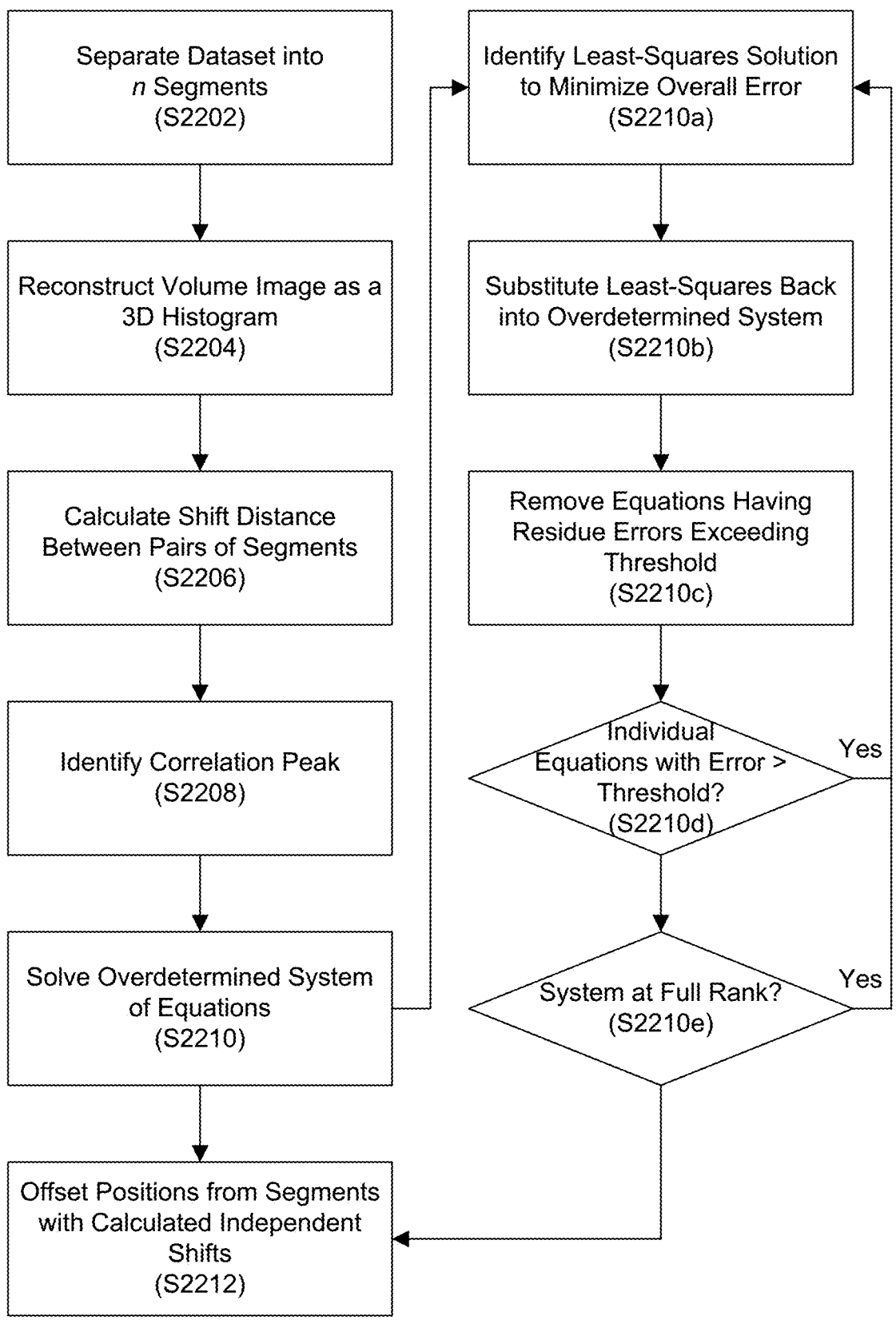

FIG. 22 depicts a method for an optical alignment method based on 3D cross-correlation according to an embodiment of the invention.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Nanoscopy

Nanoscopy techniques share a common principle: they spatially separate unresolvable fluorescent molecules by independently switching their emission 'on' and 'off'. In particular, SMSN, such as photoactivated localization microscopy (PALM), fluorescence photoactivation localization microscopy (FPALM) and stochastic optical reconstruction microscopy (STORM), uses a stochastic approach where only a small subset of fluorescent molecules is switched on at any particular moment in time while the majority remains in a non-fluorescent 'dark' or 'off' state. SMSN images are reconstructed by localizing thousands to millions of single-molecule positions.

This imaging strategy was initially applied to single-objective microscopes in two dimensions (2D) and later extended to three dimensions (3D). While these instruments achieve 20-40 nm resolution in the focal plane (lateral, x-y), the resolution in the depth direction (axial, z) is typically limited to only 50-80 nm. The resolution can, however, be further improved by using a dual-objective '4Pi' detection geometry.

Using two objectives doubles the detection efficiency and thus improves the localization precision ~1.4-fold in all three dimensions. Additionally, employing two objectives in a 4Pi geometry allows the creation of a single-molecule emission interference pattern at the detector leading to a ~7-fold improvement in axial localization precision over single-objective approaches as demonstrated in 'interferometric PALM' (iPALM) and '4Pi single marker switching nanoscopy' (4Pi-SMSN). This improved resolution enabled, for example, generating anatomical maps of focal adhesions at ~10 nm axial resolution. However, this method was initially restricted to samples of ~250 nm in thickness, and more recently to 700-1,000 nm. As the typical depth of a mammalian cell is 5-10 μm, this has limited optical microscopy at the 10 nm resolution scale to thin sub-volumes of cells thus precluding the ability to image organelles that can extend over several microns throughout the whole cell.

Fluorescence nanoscopy, or super-resolution microscopy, has become an important tool in cell biological research. However, because of its usually inferior resolution in the depth direction (50-80 nm) and rapidly deteriorating resolution in thick samples, its biological application has been limited primarily to 2D and thin samples.

Whole-Cell 4Pi Single-Molecule Switching Nanoscopy (W-4PiSMSN)

Applicant presents a new implementation of iPALM/4Pi-SMSN, termed Whole-cell 4Pi Single-Molecule Switching Nanoscopy (W-4PiSMSN), which extends the imaging capabilities of this technology to whole cells without compromising resolution. W-4PiSMSN allows volumetric reconstruction with 10-20 nm isotropic resolution of ~10-μm thick samples, a 10-40 fold improvement over existing iPALM/4Pi-SMSN. Applicant's approach permits ultra-high resolution 3D imaging of virtually any subcellular structure. To demonstrate this, Applicant imaged the endoplasmic reticulum, bacteriophages, mitochondria, nuclear pore complexes, primary cilia, Golgi apparatus-associated COPI vesicles, and mouse spermatocyte synaptonemal complexes. W-4PiSMSN thereby opens the door to address cell biology questions that were previously inaccessible.

Development of W-4PiSMSN

To realize a system that achieves 10-20 nm 3D resolution across the thickness of entire mammalian cells, Applicant expanded on previous iPALM and 4Pi-SMSN developments described in Shtengel 2009 and U.S. Patent Application Publication No. 2008/015855. In these systems, fluorescence emission is collected by two opposing objective lenses and combined to interfere as described in Aquino 2011, von Middendorff 2008, and Shtengel 2009. Depending on the axial position of a molecule, the light will interfere constructively or destructively, as indicated by the brightness of the molecule's image on the detector. However, single molecules at axial positions that differ by multiples of half the wavelength of light, lead to the same interference and cause ambiguity in determining the actual axial position of the molecule. The localization ambiguity leads to scrambled images that contain both real and axially shifted image artifacts, known as ghost images, in samples thicker than ~250 nm.

This can be avoided by using not only the brightness but also the z-position-dependent shape of the single-molecule images to determine a molecule's axial position. To address this, a higher-moment-based analysis and analysis of the point-spread function (PSF) eccentricity in a hyperbolic mirrors-modified system were developed, which extend the image volume thickness capabilities to 700-1,000 nm. However, these methods pose significant drawbacks such as poor localization density because of the highly selective computational localization processes focusing on subtle features of PSFs. They are also susceptible to sample-induced optical aberrations that change the shape of the PSF when imaging biological structures deeper in the sample. As a result, applications have been restricted to thin and flat structures close to the coverslip.

Figure 1:
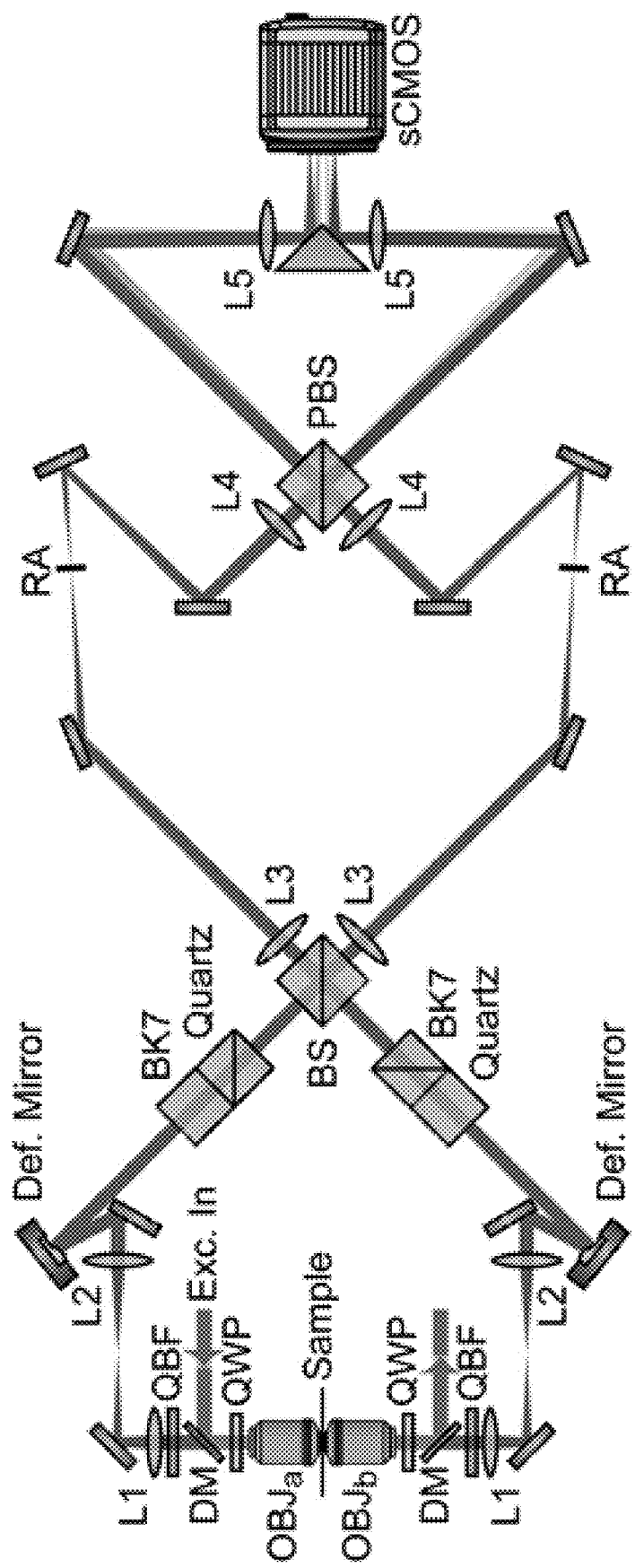
FIG. 1 depicts a system diagram of a W-4PiSMS system according to an embodiment of the invention. Elements are detailed in Table 1 below.

To enable 4Pi-SMSN to probe deeper into the cell and extend the application of this technology to larger cellular features, Applicant developed W-4PiSMS. First, Applicant included deformable mirrors in both arms of the 4Pi-interferometric cavity as depicted in FIG. 1. These mirrors to correct for imperfections in the instrument beam path and thereby optimize PSF quality as depicted in FIG. 7. Deformable mirrors also enable compensation for sample-induced aberration modes, such as spherical aberrations, which vary from sample to sample and with depth. Additionally, these mirrors can introduce astigmatism in both interference arms without adding further complexity to the system as further discussed herein. Thus, the deformable mirrors enable compromise-free, reproducible PSFs in a depth- and sample-independent manner.

Second, Applicant developed a novel analysis method that combines information from (i) the 4Pi-PSF's interference phase, which encodes the fine axial localization, but does not distinguish between different interference peaks, and (ii) the eccentricity of the astigmatic 4Pi-PSF, which narrows axial localizations down to individual interference peaks. This new analysis algorithm interprets the large number of molecules imaged in each time and z-depth window as an ensemble measurement of the concurrent W-4PiSMSN system, and determines the relationship between the eccentricity of the astigmatic PSF and the interference phase of the 4Pi-PSF. The axial positions of all corresponding molecules can then be assigned with high precision and unambiguously with the help of a monotonic metric that is designed to describe the overall shape of the PSF and maintain its monotonicity in the presence of moderate amounts of aberrations. Because this analysis is performed for well-defined temporal and axial subsets of data, it can be generalized to identify and correct drift (from both the system and the sample) over the course of imaging. The method is also robust against aberrations and improves the reliability and efficiency of the axial position assignment because it automatically adapts to changes in the shape and interference pattern of the 4Pi-PSF.

Microscope Setup

A microscope was built around a vertical bread board and a piezo/linear stage assembly (the latter denoted by a white dashed box in FIG. 2 mounted on an air damped optical table (1200×1800×300 mm, 784 Performance Series, Technical Manufacturing Corporation, Peabody, Mass.). The piezo/linear stage assembly forms the first module of the interference cavity and holds the sample and both objective lenses and allows the sample position, interference cavity path length, and objective alignment to be adjusted remotely via computer control independent of the detection beam path. The vertical breadboard holds the second module of the interference cavity, deformable mirrors, and detection optics on its front surface and the excitation beam path on the back. Three excitation laser lines at wavelengths of 642 nm (2 W, MPB Communications, Montreal, Quebec), 561 nm (500 mW, COHERENT® GENESIS® MX 56, Coherent, Inc., Santa Clara, Calif.), and 405 nm (50 nW, COHERENT® OBIS® 405 LX) reside on the optical table and are coupled into a polarization-maintaining single-mode fiber after passing through an acousto-optical tunable filter for wavelength selection and power modulation. The fiber delivers the excitation light to the back surface of the vertical breadboard, where one of two optical paths may be selected via a pair of computer-controlled motorized mirrors 402a, 402b in FIG. 4.

Still referring to FIG. 4, the first optical path (depicted in solid blue lines) illuminates an ~18×18 µm square area in the sample plane 404 with nearly uniform illumination over the excitation field via an over-illuminated adjustable rectangular aperture. The fiber tip 406 is conjugated to the objective back focal plane of the top objective lens 408a and can be translated sideways for switching between epi-illumination and highly inclined and laminated optical sheet (HILO) imaging modalities.

The second excitation path illuminates an ~100 µm diameter area for overview imaging and sample positioning.

Imaging is performed with two opposing high-numerical-aperture oil-immersion objective lenses (OLYMPUS® UPLSAPO™ PSF 100×/1.4NA, Olympus Scientific Solutions Americas Corp., Waltham, Mass.). The objective residing below the sample is mounted on a two-axis piezo stage 302 (Physik Instrumente, P-612 2SL) depicted in blue in FIG. 3, which allows for lateral objective alignment with 5 nm resolution. The axial position of the upper objective is controlled with a nanopositioning stage 304 (Physik Instrumente, N-664.3A) depicted in green in FIG. 3 with 0.5-nm resolution over a 16 mm travel range. Thus, the upper objective 408a can be axially translated away from the lower objective 408b for sample loading and then returned to the co-focal position with nanometer-accuracy. Additionally, a 940-nm diagnostic laser line is passed through the objective pair to facilitate real-time monitoring and correction of the axial and lateral objective alignment.

The axial position of the sample is controlled by a piezo stage 306 (Physik Instrumente, P-541.Z) depicted in magenta in FIG. 3 with 0.5-nm resolution for precise and repeatable imaging of optical sections at various depths. This stage is, in turn, supported by a piezo-driven XY translation stage 308 (Physik Instrumente, M-686.D64) depicted in gray in FIG. 3 with 100 nm resolution for coarse lateral sample positioning. The axial and XY sample stages are resting on a custom plate supported at three points of contact by three DC-Mike linear actuators 310 (Physik Instrumente, N-227.10) depicted in gray in FIG. 3 with 100-nm repeatability for coarse axial positioning and tip/tilt sample adjustment. Two linear stages 312 (ASI, LS-50) depicted in orange in FIG. 3 translate the entire objective-sample stage stack described above along the optical axis with a resolution of 10 nm allowing the optical path lengths of the two interference arms to be adjusted and maintained via computer control without affecting alignment in other areas of the system.

The back pupil planes of the upper and lower objective are imaged onto two respective deformable mirrors (Boston Micromachines, Multi-5.5). 0.94× telescopes reduce the size of the objective pupils to match the active areas of the deformable mirrors. The deformable mirrors allow independent aberration compensation through both detection arms and facilitate aberration-free W-4PiSMSN imaging by correcting system and sample-induced aberrations. A custom Babinet-Soleil compensator (UVisIR, custom BK7 and quartz blocks and wedges) allows system-level dispersion compensation and independent adjustment of the relative phase between the s- and p-polarizations in the two arms of the interference cavity as discussed in Aquino 2011. The upper arm of the interference cavity includes a BK7 borosilicate glass block flat-bonded to a quartz wedge. A second quartz wedge is mounted adjacent to the first one on a motorized linear translation stage, allowing for relative phase adjustment between the two polarizations in the two cavity arms. The lower cavity arm includes a complementary quartz flat-bonded to a BK7 wedge. A matching BK7 wedge is also mounted on a motorized stage for dispersion compensation across the visible spectrum. Both cavity arms include electronically controlled shutter to allow collecting PSFs through a single objective (either top or bottom) for independent aberration measurement and compensation. The final element in the interference cavity is a 50/50 beam splitter cube which is mounted on a motorized goniometer and rotation stage allowing the cube's reflective surface to be tipped and tilted without translation. This enables uniform interference across the entire field of view and allows the BS cube to be adjusted without perturbing alignment in other areas. Relay optics direct the fluorescence exiting the 50/50 beam splitter cube along two separate paths to a single camera, e.g., an sCMOS camera (Hamamatsu, ORCA-Flash 4.0v2) capable of recording 800 frames per second at 2048×256 pixels. This design enables projection of the four images (with ~π/2 phase delays between the images) along the center splitting line of the upper and lower sCMOS rolling readout regions and therefore allows recording uncompromised camera frame rates. A motorized filter wheel (84889, Edmund Optics) was mounted in front of the camera to allow sequential two-color imaging.

In addition, a motorized flip mirror and an overview camera (PCO, pco.pixelfly usb) provide a ~100 µm diameter field of view overview images of the sample, which aid in finding and positioning areas of interest in the sample. Table 3 below lists vendors and part numbers of the major components.

TABLE 3

| Part | Vendor | Part number/names |
| --- | --- | --- |
| 561 nm Laser | MPB communication | 2RU-VFL-P-2000-560-B1R |
| 642 nm Laser | MPB communication | 2RU-VFL-P-2000-642-B1R |
| 405 nm Laser | Coherent | OBIS 405 nm LX 50 mW Laser |
| Deformable Mirrors | Boston Micromachines | Multi-5.5 |
| Quartz and BK7 window | UVISIR | Custom made (call #: W-4PiSMSN) |
| AOTF | AA OPTO-ELECTRONIC | AOTFnC-400.650-TN |
| Detection filters | Semrock | FF01-607/70-25 |
| Detection filters | Chroma | ET700/75 m |
| Piezo stages | PI | M-686.D64 XY Stage |
| Piezo stages | PI | P-541.ZCD Z Stage |
| Piezo stages | PI | P-612.2SL XY Stage |
| Piezo stages | PI | N-664.3A Linear Stage |
| Linear Actuator | PI | M-227.10 |
| Vertical Translational Stage | ASI | LS-50 (FTP mode) |
| Camera | HAMAMATSU | ORCA-Flash4.0 V2 Digital CMOS Camera 22CU |
| Quad bandpass filter | Semrock | FF01-446/523/600/677-25 |
| Dichroic mirrors | Semrock | 405/488/561/635 BrightLine Laser Dichroic |
| Objectives | Olympus | UPLSAPO 100XO |
| Analysis software | Mathworks | MATLAB |
| GPU | Nvidia | GeForce GTX 580 |
| Visualization software | Multiple | Vutara (Bruker), Avizo (FEI Software), Maya 2015 (Autodesk) |

Characterization of Deformable Mirrors

Deformation of the reflective membrane on the BMC Multi 5.5 deformable mirror (DM) is induced by a set of 140 actuators positioned in a grid-patterned array beneath the membrane. Each actuator adds a degree of freedom to the shape of the deformable mirror. As previously shown in Wang & Booth 2009, the possible mirror shapes can be decomposed into an orthogonal set of so-called mirror deformation eigenmodes (in short, mirror modes), resembling Zernike modes while accounting for the stiffness of the membrane and the spatial distribution of the actuators. One mirror mode is essentially a set of displacements applied to the actuator array.

To establish the actual shape of the mirror when applying a given mirror mode, a DM characterization process was followed as detailed previously in Burke 2015. This process uses a phase-retrieval scheme as discussed in Hanser 2004 (using the Gerchberg-Saxton algorithm) and takes as input a set of images of a point emitter at known axial positions near the objective focal plane. Applicant used a sub-diffraction sized fluorescent bead (100 nm crimson, Life Technologies) and imaged it at five known axial positions: z=−0.5 µm, 0 µm, 0.5 µm, and 1 µm, where z=0 µm corresponds to the objective focal plane. Given one such three-dimensional image set, the phase retrieval scheme of Hanser 2004 provides an estimate of the pupil function, i.e., the wavefront shape at the objective pupil plane.

For each mirror mode, Applicant retrieved pupil functions for five different mirror mode amplitudes. Subsequently, the pupil functions were each decomposed into a set of Zernike modes. By fitting a first-order polynomial through the Zernike mode coefficients as a function of mirror mode amplitudes, Applicant determined the first 55 Zernike mode coefficients for each of the applied 28 mirror modes. The resulting coefficients were used to form an underdetermined system of 28 linear equations each describing the Zernike mode constituents of a single mirror mode. By solving this system of linear equations in the least square sense, each Zernike mode can be expressed as a linear combination (weighted sum) of mirror modes. This calibration process was carried out separately for the top and bottom interference arms.

System Aberration Correction

System aberrations for the upper and lower beam paths were corrected separately. The corresponding deformable mirrors were independently adjusted as follows. For each interference arm, starting from the flat voltage map (provided by the manufacturer) of the deformable mirror, 28 mirror modes described in Wang & Booth 2009 were applied sequentially. For each mirror mode, 10 different amplitudes were applied while recording the corresponding fluorescence signal from a 100-nm crimson bead sample. To extract the fluorescence signal from individual beads, the symmetry center of each imaged bead was obtained using the radial symmetry method described in Parthasarathy 2012. Subsequently, a symmetric 2D Gaussian was generated at the symmetry center and was multiplied by the isolated emission pattern from the fluorescent bead, generating a Gaussian-masked image, and then the total intensity of the masked image was calculated to extract the center peak signal of the beads in focus. For each mirror mode, images of the bead were acquired at ten different mirror mode amplitudes and the corresponding center peak signals of the bead were extracted as described above. The optimal amplitude (i.e., the amplitude providing the highest center peak signal from the beads) was determined from a quadratic fit of these ten signal measurements vs. mirror mode amplitudes. After identifying optimal amplitudes for each of the 28 modes, these amplitudes were added to the flat voltage map (provided by the manufacturer), serving as a starting point for another iteration. This iterative process was repeated five times to achieve optimal system aberration correction.

Channel Registration

As depicted in FIG. 7, each sCMOS camera frame contains four images (arranged next to each other) that represent the same field of view of the sample at different interference phase delays. In the following, these images are referred to as "phase images". One of the phase image was taken as the reference, and all the other three phase images were merged (added) into reference image using three affine transformations (one for each phase image) where the transformations were obtained from a calibration bead data set taken prior or after the imaging session (200 frames of approximately 10-15 beads in focus imaged with a single objective).

To ensure accurate merging of the four phase images, an estimation of each transformation matrix (including magnification, translation and rotation) followed the following steps. First, a Fourier Mellin Transform (implemented as "fmmatch" using the MATLAB® dipimage toolbox available at www.diplib.org) was used to obtain an initial estimation of the transform. Second, the affine transform was then obtained using the previous result from the Fourier Mellin Transform as an initial guess (implemented as "find affine trans" using the dipimage toolbox). These two sequential steps took advantage of the fact that the log-polar transformation is invariant with translation in the image and the least-square approach to find affine transformations that work well when the relative shifts between two images are small.

Lateral Position Localization

To estimate the sCMOS camera characteristics (including readout noise, offset, and gain for each pixel) in the combined frame described in the section above, noise statistics maps from all four phase images were merged in the same way as the phase images and subsequently used as the noise map in the subsequent fitting process.

As described in Huang 2013 (attached as Appendix F), a series of uniform and maximum filters were used to find isolated single molecules and sub-regions were cropped around these fitting candidates. The isolated sub-regions were then fit using the Maximum Likelihood Estimator (MLE) with the sCMOS noise model described in Huang 2013 to an elliptical 2D Gaussian described in Huang 2008 and estimates of single-molecule positions (x, y), standard deviations ($\sigma_x$, $\sigma_y$), total detected photons, background photons and log-likelihood ratio values were obtained. The threshold of the log-likelihood ratio metric used as the goodness of fit test described in Huang 2011 was set to a relatively large value with the intention to filter out sub-regions that contained multiple emitters.

Extraction of Single-Molecule Phase

To estimate the phase of the single-molecule interference (a prerequisite to determine the z-position of the molecule), the estimated lateral single-molecule positions (x, y) were inverse-transformed (affine) back to the four separate phase images. Each of these positions pinpoints the center location of the single molecule in the four phase images in W-4PiSMSN. Using these center locations of single molecules in the four phase images, the $0^{th}$ moment intensities described in Aquino 2011 were calculated by a weighted least-square fit of a Gaussian. As the center location of the molecule is already known, the weighted least-square fit was used to estimate the amplitude. Due to the pixel-dependent readout noise of sCMOS cameras, the weight for each pixel i is assigned as $$D_i + \frac{\sigma_i^2}{g_i^2},$$

where $D_i$ is the pixel count, and $\sigma_i^2$ and $g_i$ are the pixel-dependent readout noise variance and gain of the sCMOS sensor, respectively. In this way, the sCMOS-specific pixel-dependent noise into account is taken into account.

The phase shift between s- and p-polarization was adjusted such that it is close to $\pi/2$ for both detection channels. However, due to dispersion, this phase shift differed by ~0.3 radians in the prototype system for the two imaging channels (607 nm and 700 nm center wavelengths). Applicant calibrated the phase shifts for the two color channels independently using a bead sample that could be observed in both color channels (100 nm crimson beads).

To extract the interference phase of each single molecule, Applicant extracted the $0^{th}$ moment amplitudes of each single molecule from the four phase images and, subsequently, the reduced moments, $RM_s$ and $RM_p$, were calculated. Using the previously calibrated phase shifts, Applicant obtained the phase of the single-molecule interference PSF by solving the set of equations (1).

$$\begin{cases} A_0 \cos(\varphi_0) - RM_s = 0 \\ A_0 \cos(\varphi_0 + \varphi_{shift\_ch}) - RM_p = 0 \end{cases} \quad (1)$$

$A_0$ and $\varphi_0$ are the unknowns representing the amplitude and single molecule phase, respectively. $\varphi_{shift\_ch}$ was previously obtained through the calibration using the bead sample for a specific channel and $RM_s$ and $RM_p$ are the reduced moments of $0^{th}$ order. For two-color imaging, the values of $\varphi_{shift\_ch}$ were different for the two different wavelength channels and were obtained for each color channel through the calibration.

Axial Localization Based on Monotonic Metric and Local Ridge Detection

Accurate and precise axial position estimation can be challenging when based only on astigmatism because even a small amount of sample-induced aberrations creates image distortions and artifacts which cause the PSF to deviate from the calibration curve. This effect is increasingly problematic when imaging deep into a sample. Single-molecule interference, however, only relies on the path-length differences between the two interference arms and thus provides the opportunity for accurate large volume super-resolution imaging. Due to these concerns, Applicant did not use the astigmatism shape information for axial localization, but, instead, used the astigmatism shape information unwrap the single-molecule phase and thus avoid distortions and artifacts as described below.

Referring now to FIG. 20, the algorithm started with a segment of W-4PiSMSN data (usually 3,000-5,000 frames, 10-200 segments per dataset) containing single-molecule emissions events. For each single-molecule emission, localization methods described above allowed the algorithm to extract the interference phase $\varphi_0$ and standard deviations of the 2D Gaussian $\sigma_x$ and $\sigma_y$. Thus, the algorithm obtained a list of these values for all single-molecule detection events in the data segment.

In step S2002, a metric m that changes its value depending on axial positions of single molecule emission events in a plurality of single-molecule emission events can be calculated. Metric m can describe the overall shape of the emission events and preserve its monotonicity in the presence of a small amount of aberrations. In one embodiment, $$m = \frac{\sigma_x^3}{\sigma_y} - \frac{\sigma_y^3}{\sigma_x}.$$

For numerical convenience, the algorithm can normalize m by $2\pi/40$.

In step S2004, a histogram or scatter plot of interference phase $\varphi_0$ over metric m can be created. From this list of $\{m\}$ and $\{\varphi_0\}$, values for all single-molecule detection events in the data segment, the algorithm generated a 2D histogram image. FIG. 8A shows a contour plot of such a histogram. As m is monotonic against the axial position and $\varphi_0$ is periodic with a period of $2\pi$, the resulting 2D histogram resembles tilting stripes that are repeated over the range of the (normalized) metric m.

Using the histogram, the problem is now reduced to a phase unwrapping problem. Applicant sought to find a continuous phase variation, $\varphi_0$, with respect to m in an ensemble collection of single-molecule detection events.

In step S2006, a piece-wise monotonic path-finding algorithm is applied to the histogram or scatter plot to identify a piece-wise monotonic path with respect to metric m. In one embodiment, the monotonic path-finding algorithm is a ridge-finding algorithm that incrementally follows the peak of these stripes with the following three properties as depicted in FIG. 8B. First, it self-adapts to the shape and curvature of the stripes. These shapes and curvatures are sample and depth-dependent and also vary between data segments within a single dataset. Second, the algorithm finds a continuous ridge through the histogram without jumping to the adjacent ridge. This is important because errors in this aspect cause errors in the unwrapping step that lead to localization artifacts and ghost images in the final image as discussed herein. Third, the algorithm is monotonic in the sense that no two points on the growing path share the same value of m to ensure unambiguous position assignment of single molecules.

To find the ridge along the wrapping histogram stripes, the algorithm started with an initial peak-finding process. The maximum peak spot was first identified ($P_0$) and the second peak ($P_1$) was then identified by searching within a radius range defined by $r_{min}$ and $r_{max}$ from $P_0$ as depicted in FIG. 8A. The search range restriction was used to allow the generation of an initial vector ($\overrightarrow{P_0P_1}$) that points along the direction of the running ridge as depicted in FIG. 8A. Next, the algorithm searched for the next peak starting from $P_1$. The algorithm assigned the search radius range as $r_{min}$ and $r_{max}$ centering around $P_1$ and also assigned the direction (or vision) of the search in the direction of $\overrightarrow{P_0P_1}$ with ~0.2 rad angle width forming a cone-shaped "search vision" as depicted in FIG. 6A. The next peak, $P_2$, was identified by finding the pixel with maximum value on the 2D histogram within the search range and search vision centered around $P_1$. Subsequently, $P_2$ served as the starting point for the next search, and so on. In this way, the path grew up to $P_n$ where the value of the 2D histogram at the next peak $P_{n+1}$ was less or equal than a threshold. Therefore, the path $P_0P_1 \ldots P_n$ identified half of the ridge of the histogram. Next, the algorithm used the same approach to find the path in the opposite direction (starting with $P_0$ with a initial direction of $\overrightarrow{(P_1P_0)}$) and generated the other half of the path $P_1P_0 \ldots P_{-m}$. The two paths (forward and backward) were subsequently combined ($P_{-m} \ldots P_0P_1 \ldots P_n$) providing a piece-wise monotonic, self-adapting and unambiguous curve through the phase-metric plot.

In step S2008, the piece-wise monotonic path can be unwrapped into a monotonic path by adding an integer multiplication of $2\pi$ in different sections of the piece-wise monotonic path such that the piece-wise monotonic path is converted into a single-piece monotonic path. With the piece-wise monotonic path, the algorithm can now un-wrap it as described in Judge & Bryanston-Cross 1994 into a monotonic path (implemented using "unwrap" in MATLAB® software). For each single-molecule detection event, with a corresponding m and $\varphi_0$ pair, the algorithm determined the point $P_{path}$ on the piece-wise monotonic path that gives the minimum distance to point (m, $\varphi_0$) and, therefore, unwrap the (m, $\varphi_0$) together with $P_{path}$. This was accomplished by adding the same integer multiplication of $2\pi$ to (m, $\varphi_0$) as was added during the unwrapping process for $P_{path}$. Therefore, with the help of Applicant's shape metric m, this process unwrapped $\{\varphi_0\}$ and resolved the ambiguity due to its periodicity. To allow accurate translation of phase-unwrapped values $\{\varphi_0\}$ to axial position estimates $\{z_{est}\}$, Applicant simulated W-4PiSMSN PSFs using a pupil function approach described in Hanser 2004. W-4PiSMSN PSFs were simulated for both detection channels (607 nm and 700 nm). Modulation frequencies (unit: radians ($\varphi_0$, phase) per nm ($z_{est}$, axial position)) were identified in these PSFs and were used to translate the phase into axial positions in both single-color and two-color measurements.

In step S2010, for each of a plurality of the single-molecule emission events: a point $P_{path}$ on the single-piece monotonic path having a minimum distance to a point (m,$\varphi_0$) corresponding to the event can be identified in step S2010a; an integer multiplication of $2\pi$ associated with point $P_{path}$ during the unwrapping step S2008 can be identified in step S2010b; the integer multiplication of $2\pi$ can be added to the point (m,$\varphi_0$) corresponding to the event to obtain (m, $\varphi$) in step S2010c; and an axial position of the single-molecule emission event using $\varphi$ can be determined in step S2010d.

3D Drift Correction with Redundancy

Referring now to FIG. 21, Applicant developed a 3D drift correction algorithm.

In step S2102, the entire dataset was split into n segments (usually 3,000-5,000 frames each, resulting in n=10 to 200 segments per dataset).

In step S2104, for each data segment, a volume image with $(25 \text{ nm})^3$ voxel size was reconstructed as a 3D histogram where the count for each pixel in the histogram equals the number of localization estimates falling into the voxel.

In step S2106, 3D cross-correlation can then be used to calculate the shift distance between each pair of data segment volumes.

In step S2108, a correlation peak can be identified in the 3D cross-correlation result to determine a shift distance between pairs of the n segments. For example, Fourier interpolation can be used to identify the peak with an effective pixel size of 1.2 nm in the final interpolated image. This process pinpoints the shift distance ($x_{shift}^{i \to j}, y_{shift}^{i \to j}, z_{shift}^{i \to j}$) between two data segment volumes (i and j). For a total of n data segments, there are $$\frac{1}{2}n(n+1)$$

of such shift measurements (which are not independent) forming an overdetermined system to determine independent shifts between adjacent data segments, $\{(x_{shift}^{0 \to 1}, y_{shift}^{0 \to 1}, z_{shift}^{0 \to 1}), \ldots, (x_{shift}^{i \to i+1}, y_{shift}^{i \to i+1}, z_{shift}^{i \to i+1}), \ldots, (x_{shift}^{n-1 \to n}, y_{shift}^{n-1 \to n}, z_{shift}^{n-1 \to n})\}$, including a total of n−1 unknown independent shifts. For example, the [i,j]th equation of the overdetermined system would be $D_{ij} = r_{i,i+1} + \ldots + r_{j-1,j}$, where $D_{ij}$ is the shift between segment i and j, and $r_{i,i+1}, \ldots r_{j-1,j}$ are shifts between adjacent pairs. For each coordinate (x, y, and z), a system of linear equations can be established as described in Li 2013.

In step S2110, the overdetermined system of shift distances can be solved to determine independent shifts. In one embodiment, least-squares solutions that minimize the overall error of the equation stacks are calculated (S2110a) and substituted back into all equations (S2110b). Residual errors can be calculated for each of these equations and an equation can be removed from the system of linear equations if its error is larger than a threshold (e.g., about 7 nm) (S2110c). This process can be repeated until no single equation has an error larger than a threshold (e.g., about 7 nm) (S2110d) or the system of linear equations was no longer at its full rank (S2110e). In step S2112, positions from a plurality of segments in the 3D point collection dataset can be offset with the independent shifts calculated in step S2110 to correct for drift.

Data Analysis for Multi-Optical Section Data

To image thick samples, optical sections were recorded at different axial positions of the sample by axially translating the z-piezo holding the sample stage. The localization data contains x, y, and z position estimates of different optical sections and can be aligned/stitched seamlessly to support the high precision obtained in W-4PiSMSN. Previous methods that shift each optical section by a constant in the axial direction have been prone to introduce misalignment of the optical sections and subsequently make the resolution achievable in thick samples worse.

Referring now to FIG. 22, Applicant developed an optical alignment method based on 3D cross-correlation.

In the W-4PiSMSN system, optical sections are ~1.2 µm thick. Whole-cell samples were scanned in the axial direction with 500-nm step sizes, which allowed for abundant overlapping regions between adjacent optical sections. This overlapping information between optical sections allow for precise optical section alignment using the cross-correlation methods described below.

In step S2102, similar to the "3D Drift Correction with Redundancy" method 2100 discussed herein, for each data segment (an optical section in this case), a volume image with was reconstructed as a 3D histogram where the count for each pixel in the histogram equals the number of localization estimates within the voxel. In one embodiment, the voxel size is $(25 \text{ nm})^3$. Given a 500-nm axial step size of the sample stage, Applicant observed an effective shift of only ~400 nm between adjacent reconstructed optical sections. This inconsistency is explained by the index of refraction mismatch between the sample (~1.33-1.37) and the immersion media (~1.51). Therefore, expecting a peak around 400 nm in the correlation volume (generated as described in the "3D Drift Correction with Redundancy" section herein), the algorithm isolated a small 3D sub-volume around this expected center and determined the local peak within this sub-volume. In this way, the algorithm isolates the desired peak from the noise-induced peaks that are usually located in the center of the correlation volume. The noise-induced center peak is especially strong and thus problematic when two images (in this case, volumes) only partially overlap, which is here the case.

In step S2204, 3D cross-correlation is performed between overlapping pairs of the n segments. As described herein, to find the local correlation peak from the 3D cross-correlation sub volume, Fourier interpolation can be used to identify the peak with an effective pixel size of about 1.2 nm in the final interpolated image.

In step S2206, the resulting peak identifies shifts between the two adjacent optical sections.

In step S2208, independent shifts between adjacent optical sections can be determined by solving an overdetermined system of shift distances from all of the overlapping pairs. S2208 can include steps S2110a-S2210e as discussed herein.

In step S2210, positions from each of the n optical section within the 3D point collection dataset can be offset with their determined independent shifts.

Multi-Color Data Alignment

Two-color imaging was performed sequentially, first in the ALEXA FLUOR® 647 (AL647) channel and then the Cy3B channel. Specifically, for two-color imaging, the algorithm shifted all the AL647 data segment volumes in the drift correction step of the "3D Drift Correction with Redundancy" method to align with the last data volume at the end of the AL647 imaging session. For the Cy3B channel, the algorithm aligned all Cy3B data segment volumes with the first data segment volume in the beginning of the Cy3B imaging session. There was a 2-4 s pause between the recording of the two color channels and Applicant assumed system drift and sample drift during this interval to be negligible.

To align 3D volumes after drift correction from one color channel to another, Applicant obtained a 3D affine transformation from a training dataset using double-stained (AL647 and Cy3B) mitochondria (implemented as "imregtform" in MATLAB® software) from a 3D histogram image as described in the "3D Drift Correction with Redundancy" and "Data Analysis for Multi-Optical Section Data" sections herein with a voxel size of $(25 \text{ nm})^3$. The obtained registration matrix (affine) was then applied to all single-molecule position estimates from one channel to allow 3D color registration of two color volumes.

Cilia Membrane Flattening

First, a manually selected region of interest (ROI) is fit (least square) with a cylinder model. Then, the region was aligned such that the cylinder axis became the z-axis and the ROI was centered at the origin of the coordinate system. Based on the new coordinate system, each single-molecule localization was transformed into a modified version of cylindrical coordinates $(\rho, \varphi, z)$. Surface plots were obtained by generating a 2D histogram of the cylindrical coordinates of single molecules as $\rho-r$ and $\varphi$, where r is the radius of the fitted cylinder model.

Template-Free Point Cloud Registration for T7 Phage Data

A total of 115 T7 phages, each represented by a point cloud, were automatically identified from 14 W-4PiSMSN datasets. The orientation and the structural center were obtained by fitting the point cloud to a straight line and sphere, respectively. All phages were then centered at the origin of a Cartesian coordinate system and rotated such that their orientation (icosahedron capsid) aligned with the z-axis.

These pre-aligned phages were then aligned to each other using Gaussian Kernel Correlation registration as described in Brostow 2004, with a simplified version of the pyramid scheme described previously in Broeken 2015, by allowing it to rotate around the z-axis. This second alignment step created an initial guess for the final phage averaged structure. The final averaged structure was obtained by aligning all original phage results to the initial guess. To improve performance of the registration algorithm, a Fast Gauss Transform as described in Jain & Vemuri 2011 was implemented.

Point Cloud Clustering Algorithm to Isolate Synaptonemal Complexes

Referring now to FIG. 19, paired strands of synaptonemal complexes were isolated using a clustering algorithm described in Klasing 2008 where single-molecule localization estimates located within a 500-nm distance from each other were assigned to the same cluster. The algorithm terminated when all points were processed and assigned to clusters. To avoid over-counting caused by unspecific labeling, final clusters with fewer than 750 points were discarded.

Noise Reduction

To allow robust and precise feature detection and alignment in point cloud data, the point clouds were first processed through a noise filter where all points whose number of neighbor points within a given distance was below a user-defined threshold were discarded. While this noise filter was only used to improve feature detection and model construction, the raw single-molecule localization results (without de-noising) were used after the alignment process to provide quantifiable final results. This method was applied to help feature extraction in phage, cilia and synaptonemal complex datasets and to generate the shown synaptonemal complex images.

Coverslip Preparation and Cell Culture 25 mm diameter round precision glass cover slips (Bioscience Tools, San Diego, Calif.) were immersed in 1M KOH and sonicated for 15 min in an ultrasonic cleaner (2510 Branson, Richmond, Va.). The glass was then generously rinsed with MILLI-Q® water (EMD Millipore, Billerica, Mass.) and sterilized with 70% ethanol. The glass was dried and poly-L-lysine coated before 100-nm Crimson beads (Life Technologies, Grand Island, N.Y.) were attached to the top surface. Before cells were plated on the beads, the surface was rinsed three times with PBS. Cells were grown on coverslips for 2-24 hours before fixation.

COS-7 cells (ATCC, CRL-1651) were grown in DMEM (Gibco, 21063-045) with 10% Fetal Bovine Serum (FBS) and 1% Penicillin-Streptomycin (Gibco, 15140-122) at 37° C. with 5% $CO_2$. BSC1 cells (ATCC, CCL-26) were grown in DMEM (Gibco, 21063-045) with 10% FBS at 37° C. and 5% $CO_2$. RPE-hTERT cells were grown in DMEM/F12 (Gibco 11330-032) with 10% FBS and 1% Antibiotic-Antimycotic (Gibco, 15240-062) at 37° C. and 5% $CO_2$.

Secondary Antibody Labeling

Except where noted otherwise, primary antibodies were labeled with ALEXA FLUOR®-647-conjugated goat anti-mouse or goat anti-rabbit secondary antibodies (Thermo Fisher Scientific, A21236, A21245, Waltham, Mass.). Secondary antibodies labeled with Cy3b were made by reacting Cy3b NHS esters (GE Healthcare, Malborough, Mass.) with unlabeled secondary antibodies (Jackson ImmunoResearch Laboratories, Inc., West Grove, Pa.) according to the manufacturer's protocol. Free dye was separated from labeled antibody by gel filtration using an ILLUSTRA® NAP-5 column (GE Healthcare). Samples were labeled with secondary antibodies at a dilution between 1:1000 and 1:200 for 30 to 60 min at room temperature. Where noted, a post-fixation step of 3% paraformaldehyde (PFA, Electron Microscopy Sciences, 15710, Hatfield, Pa.)+0.1% glutaraldehyde (GA, Electron Microscopy Sciences, 16019, Hatfield, Pa.) was performed after secondary antibody labeling. Samples were rinsed three times with PBS and stored in PBS until they were imaged.

Microtubule Samples

Microtubule samples were prepared similar to Huang 2013). COS-7 cells were grown on prepared coverslips. Cells were rinsed three times with 37° C. Phosphate-Buffered Saline (PBS) before a 1-min pre-extraction incubation in pre-warmed 0.2% saponin in cytoskeleton buffer (CBS, 10 nm IVIES pH 6.1, 138 mM NaCl, 3 mM $MgCl_2$, 2 mM EGTA, 320 mM sucrose) to remove tubulin monomers from the cell cytoplasm. Immediately following the pre-extraction step, the cells were fixed for 15 min at room temperature in 3% PFA and 0.1% GA diluted in CBS. After fixation, the cells were rinsed three times in PBS before being permeabilized and blocked in blocking buffer (3% bovine serum albumin (BSA, Jackson ImmunoResearch) and 0.2% triton X-100 in PBS) for 30 min at room temperature. Mouse anti-α-tubulin antibody (Sigma-Aldrich, T5168, St. Louis, Mo.) was used at 1:1000 dilution for a 4° C. overnight incubation. Antibodies were diluted in 1% BSA and 0.2% Triton X-100 in PBS. Cells were washed three times for 5 min each in wash buffer (WB, 0.05% Triton X-100 in PBS). Secondary antibodies were used to label cells for 1 h at room temperature. Cells were washed again in WB for 5-min incubations three times and then post-fixed with 3% PFA+0.1% GA for 10 min. Samples were rinsed three times with PBS.

ER Samples

COS-7 cells were grown on prepared coverslips and then transfected with mEmerald-Sec61-C-18, a gift from Michael Davidson (Addgene plasmid #54249), using LIPOFECTAMINE® 2000 (Thermo Fisher Scientific). 12-24 h later, cells were fixed using 3% PFA+0.1% GA in PBS for 15 min. Cells were permeabilized for 3 min at room temperature with 0.3% IGEPAL-630 (Sigma-Aldrich)+0.05% Triton X-100 (Sigma-Aldrich)+0.1% BSA in PBS. Samples were blocked with blocking buffer (5% normal Goat serum, 0.05% IGEPAL-630, 0.05% Triton X-100 in PBS). Rabbit anti-GFP (Thermo Fisher Scientific, A-11122) was used at 1:500 to label mEmerald-Sec61β overnight at 4° C. Antibodies were diluted in blocking buffer. Samples were washed in wash buffer (WB, 0.2% BSA, 0.05% IGEPAL-630, 0.05% Triton X-100 in PBS) for 5 min three times before labeling with secondary antibody for 1 h at room temperature. Samples were then washed again in WB for 5-min incubations three times before they were post-fixed with 3% PFA+0.1% GA.

Mitochondria and Mitochondria & Microtubule Samples

COS-7 cells were grown on prepared coverslips and fixed using 3% PFA+0.1% GA in PBS for 15 min. Cells were permeabilized for 3 min at room temperature with 0.3% IGEPAL-630+0.05% TRITON X-100+0.1% BSA in PBS. Samples were blocked with blocking buffer (5% normal Goat serum, 0.05% IGEPAL-630, 0.05% Triton X-100 in PBS). Rabbit anti-TOM20 (Santa Cruz Biotechnology sc-11415, Dallas, Tex.) was used at 1:500 and mouse anti-α-tubulin (Sigma-Aldrich, T5168) was used at 1:1000 and they were incubated with samples overnight at 4° C. Antibodies were diluted in blocking buffer. Cells were washed in wash buffer (WB, 0.2% BSA, 0.05% IGEPAL-630, 0.05% Triton X-100 in PBS) for 5-min incubations three times. Cells were labeled with secondary antibodies for 1 h at room temperature. Then samples were then washed again with WB for 5 min three times before they were post-fixed with 3% PFA+0.1% GA.

Golgi Samples

BSC1 cells were grown on prepared coverslips and fixed with 4% paraformaldehyde in PBS for 15 min. Cells were permeabilized for 3 min at room temperature with 0.3% IGEPAL-630+0.05% TRITON X-100+0.1% BSA in PBS. Samples were blocked in blocking buffer (5% normal Goat serum, 0.05% IGEPAL-630, 0.05% Triton X-100 in PBS). Mouse anti-Beta COP (Palmer et al., 1993) was used to label COPI at 1:2000 dilution in blocking buffer overnight at 4° C. Cells were washed in wash buffer (WB, 0.2% BSA, 0.05% IGEPAL-630, 0.05% TRITON X-100 in PBS) three times for 5 min each before labeling with secondary antibody for 1 h at room temperature. Samples were then washed with WB for 5 min three times before being post-fixed with 3% PFA+0.1% GA.

Synaptonemal Complex Samples

Testes were removed from 17-18 day old euthanized mice. The protocols for the care and use of mice at suitable ages were approved by the Institutional Animal Care and Use Committee (IACUC) of The Jackson Laboratory. Each testis was disrupted in PBS supplemented with protease inhibitors using a razor blade. The cell pellet was collected after centrifugation at 9,000 rpm for 10 min. The cells were resuspended and allowed to settle on prepared coverslips. They were then fixed with 4% PFA for 15 min, rinsed with PBS three times, and permeabilized with 0.5% TRITON X-100 in PBS for 10 min. Before incubating with primary antibody, spermatocytes were treated with IMAGE-IT® signal enhancer (Thermo Fisher Scientific) and blocked with MAXBLOCK™ blocking medium (Active Motif). Cells were stained with anti-SYCP3 (Abcam, ab15093, Cambridge, Mass.) overnight at 4° C. Cells were then washed three times for 5-min incubations in wash buffer (WB, 0.1% TRITON X-100 in PBS) before labeling with secondary antibodies for 3 h at 37° C. Cells were washed again three times for 5 min each in WB.

Preparation of ALEXA FLUOR®-647-Labeled T7 Bacteriophage

T7 bacteriophage lysate was prepared from 100 ml of *E. coli* MG1655 cultures grown in LB at 30° C. The phage lysate was subjected to PEG precipitation and cesium chloride-gradient centrifugation as described in Chan 2005 with some modifications. Following the PEG precipitation step, ~300 µl of phage in borate buffer (50 mM borate, pH 8.5) was incubated with 100 µg of ALEXA FLUOR® 647 NHS ester (4 µg/µl in DMSO; Thermo Fisher Scientific) for 30 min at room temperature. The labeled phage particles were first purified using a Bio-Spin P30 column (Bio-Rad Laboratories, Hercules, Calif.) to remove most of the free dye and then subjected to cesium chloride gradient centrifugation. Cesium chloride was removed using a Bio-Spin P30 column and phage particles were eluted in T7 storage buffer (10 mM Tris pH 7.5, 10 mM $MgCl_2$).

Coverslips were cleaned as described in Lim 2014. Briefly, the coverslips were cleaned by sonication in 1M KOH, double-distilled $H_2O$, and 70% ethanol for 15 min each at room temperature. 0.1% poly-L lysine was added to the cleaned coverslip, incubated for 30 min at room temperature, washed with T7 storage buffer, and then dried with pressured air. For imaging, 20 µl of the phage lysate was spotted onto cleaned coverslip, incubated for 1 min at room temperature, and then washed extensively with T7 storage buffer. The coverslip was air-dried before imaging.

Labeling of Nuclear Pore Complexes hTERT-RPE1 cells were grown to 100 percent confluence on prepared coverslips. Cells were pre-permeabilized with pre-warmed 0.1% Saponin in PBS for 1 min. Cells were then rinsed with pre-warmed PBS and fixed with methanol at −20° C. for 5 min. Samples were blocked with 5% BSA+ 0.1% TRITON X-100 in PBS. After blocking, cells were labeled with goat anti-rabbit Nup358 for 1 h at room temperature. Antibodies were diluted in 1% BSA+0.1% TRITON™ X-100 in PBS. Cells were washed three times with PBS for 10 min each. Primary antibodies were labeled with secondary antibodies for 1 h at room temperature. Cells were washed three times in PBS for 10 min each.

Cilia Sample Preparation hTERT-RPE1 cells that stably express pHlourin-mSmoothened (pH-mSmo) were grown on prepared coverslips. To induce ciliogenesis, the cells were incubated in DMEM/F12 media with 0.5% FBS and 100 nm Cytochalasin D for 48 h.

After ciliogenesis induction, cells were washed twice in PBS and fixed for 10 min with 4% PFA+0.2% GA+0.1% TRITON™ X-100 in PBS. Fixed cells were then washed twice with PBS+0.05% TWEEN polysorbate 20 followed by a 30 min incubation in blocking buffer (5% BSA+0.05% TWEEN polysorbate 20 in PBS). Cells were incubated with the primary rabbit anti-GFP antibody (Thermo Fisher Scientific, A11122) at 1:500 dilution in blocking buffer for 1 h at room temperature. Then cells were washed with three 5 min incubations in wash buffer (0.05% Tween20 in PBS). Cells were labeled with secondary antibody diluted in blocking buffer for 30 min at room temperature. Samples were washed three times for 5 min each in wash buffer, and followed by two rinses in PBS.

Imaging Buffers

Two different imaging buffers were used.

The conventional β-mercaptoethanol imaging buffer was prepared as previously reported in Huang 2013. The imaging buffer was made immediately before use where catalase and glucose oxidase were diluted in base buffer (50 mM Tris pH 8.0, 50 mM NaCl, 10% glucose).

The imaging buffer containing cyclooctatetraene (COT) was prepared according to Olivier 2013. Mercaptoethylamine (MEA, Sigma-Aldrich, 30070) was dissolved in deionized water as 1M stock solution, and then adjusted to pH 8 by glacial acetic acid (Avantor Performance Materials). The stock solution was stored at 4° C. and used within a week. β-mercaptoethanol (BME, Sigma-Aldrich, 63689) was used without dilution as 14.3 M solution. Cyclooctatetraene (COT, Sigma-Aldrich, 138924) was diluted in DMSO as 200 mM stock solution and stored at 4° C. Protocatechuic acid (PCA, Sigma-Aldrich, 37580) was dissolved in deionized water as 100 mM stock solution, then adjusted to pH 9 by KOH aq. The stock solution was stored at 4° C. and used within a month. Protocatechuate 3,4-dioxygenase from *Pseudomonas* sp. (PCD, Sigma-Aldrich, P8279) was dissolved in 100 mM Tris-HCl (pH 8) containing 50 mM KCl, 1 mM EDTA and 50% glycerol as 5 µM stock solution, and stored at −20° C. The imaging buffer consists of base buffer (50 mM Tris pH 8.0, 50 mM NaCl, 10% glucose) with the addition of 10 mM MEA, 50 mM BME, 2 mM COT, 2.5 mM PCA and 50 nM PCD. The buffer was prepared immediately before use.

Sample-Mounting in W-4PiSMSN

Prepared sample coverslips were drained and subsequently mounted on a custom-designed sample holder. A custom-made spacer ring (9513K111, McMaster-Carr, Princeton, N.J.) was put on top of the sample coverslip and then 50 µL imaging buffer as described above, was added to the center of the coverslip. Another coverslip was put on top and excess imaging buffer was drained. The samples were then sealed with two-component silicone putty (PICO-DENT™ TWINSIL™, Picodent, Wipperfürth, Germany). After solidification of the silicone, the samples were transferred to the W-4PiSMSN microscope for imaging.

Ultra-High Resolution Imaging with W-4PiSMSN

To demonstrate the resolution capabilities of the new system, Applicant first imaged the endoplasmic reticulum (ER). ER membranes were labeled by overexpressing the trans-membrane protein mEmerald-Sec61β in COS-7 cells and immunolabeling mEmerald on the cytosolic face of the ER membrane. Applicant visualized the ER as a connected network of hollow tubes with 60-80 nm diameters as depicted in FIG. 9, Panels B and C. Both horizontal and vertical cross-sections (FIG. 9, Panels B and C) reveal the 3D membrane contour that was previously resolvable only with electron tomography. To test Applicant's approach on even smaller structures, Applicant imaged antibody-labeled microtubules in COS-7 cells, a gold standard in SMSN (FIG. 9, Panels D-H). Without any detectable imaging artifacts, the W-4PiSMSN instrument resolves this 25 nm microtubule filament, which appears as a hollow core coated with antibody in all orientations (FIG. 9, Panels E-H). In addition, the dataset features a high localization density of ~5.5 localization events per 10×10 $nm^2$ of surface area. Displaying the localization events by their radial distance from the tubule axis shows a Gaussian peak with a full width at half maximum (FWHM) of 16-24 nm (FIG. 10). Considering that the use of primary and secondary antibodies adds uncertainty to the actual position of the imaged dye molecules, Applicant concluded that the 3D resolution of the instrument is well below 20 nm (FWHM).

To demonstrate Applicant's approach on another challenging target, Applicant imaged T7 bacteriophages. They feature an icosahedral-shaped capsid of ~60 nm diameter, which has only been visible by cryo-electron microscopy (cryo-EM) techniques. Applicant non-specifically labeled proteins on the surface of purified T7 phages using an ALEXA FLUOR® 647 NHS ester, which reacts with primary amines, and mounted them on a coverslip (FIG. 11). Image slices of a single phage in the x-y, y-z and x-z directions show a hollow center in all dimensions. To further refine the details of the detected phage structures, Applicant adapted the tomogram-averaging approach described by Briggs 2013 and Broeken 2015 for cryo-EM. By combining 115 T7 particles, the averaged reconstruction reveals the icosahedral shape of the T7 phages seen in FIG. 9, Panels I-L. As presented in FIG. 9, Panels J-L, a slice perpendicular to the major axis shows the expected pentagonal shape while a slice parallel to the major axis reveals a hexagonal shape. Thus, W-4PiSMSN system enabled the first visualization of the ultrastructure of bacteriophages using light microscopy.

Applicant tested the two-color imaging capability of W-4PiSMSN by imaging microtubules and mitochondria in a COS-7 cell immunolabeled with ALEXA FLUOR® 647 and Cy3B dyes, respectively. Applicant's reconstructions show microtubules running in close proximity ~10-20 nm to the top and bottom surfaces of the mitochondria (FIGS. 12A-13C). Applicant's system decouples axial localization from the PSF shape, the latter being susceptible to depth-dependent distortions caused by sample-induced optical aberrations. While single-objective systems rely on the PSF shape, the W-4PiSMSN approach uses the relative interference amplitudes to determine the axial localization of individual molecules. A complication arises, however, because the spatial interference modulation frequency is wavelength-dependent and differs between color channels. Applicant derived the modulation frequency using a pupil function approach described herein, and confirmed this theoretical finding by registering two color channels from an affine transformation matrix which was calibrated using two-color labeled biological samples of mitochondria as described herein.

Whole-Cell 3D Imaging with W-4PiSMSN

Imaging volumes thicker than ~1.2 μm requires axial sample scanning because molecules more than ~600 nm out of focus cannot be identified and localized efficiently. Thus, optical sections must be recorded at different axial sample positions and subsequently merged to obtain the complete cellular volume. Compared to conventional 3D nanoscopes, the superior localization precision of the W-4PiSMSN approach puts high demands on the localization accuracy in each volume section (i.e. avoiding volume distortions) and the merging process. In the section merging process, small misalignments of neighboring optical sections caused by sample-induced aberrations or drift can lead to significant deterioration of the resolution and distortions of the super-resolved volume.

Applicant designed the system to minimize drift. The instrument design takes advantage of a horizontal symmetry plane coinciding with the common focal planes of the objectives and the beam splitter cube of the interference cavity. This symmetric design desensitizes the interferometric cavity of the microscope to temperature changes leading to approximately equal thermal expansion in both arms of the interference cavity. To compensate for any remaining instrument and sample drift caused by mechanical and thermal fluctuations, Applicant developed a set of hardware and software tools described and depicted in the context of FIGS. 2-4. The objectives are stabilized in 3D relative to each other by focusing a near-infrared laser beam by one objective and detecting the focus with the other objective in a 'biplane' configuration. This allows the detection of relative objective movement in 3D, which can then be compensated for with the help of a feedback loop. Furthermore, Applicant cross-correlates 3D volume data segments of 1-2 min windows using a redundancy-based drift correction method as described in Li 2013 and Wang 2014 in an extended correlation volume. Within each of these short segments of data, an independent relationship between astigmatism and interference phase is established. Any discrepancies between these relationships for different segments are treated as drift as described herein. The above described methods enable full compensation for sample and instrument drift and changes in the optical path between the two arms of the interferometric 4Pi cavity due to the axial scanning nature of the measurements.

To demonstrate the whole-cell imaging capabilities of the W-4PiSMSN system, Applicant imaged mitochondria using antibodies against the outer membrane protein TOM20 over the whole thickness of a COS-7 cell. FIG. 15 reveals the outer membrane contour and the remarkably interconnected mitochondrial network over a depth of 4.3 μm (FIG. 15, Panels B-D). Applicant is not able to detect any significant ghost images within the volume (FIG. 15, Panels A-D).

To further demonstrate that image quality is maintained throughout the thickness of whole cells, Applicant imaged nuclear pore complexes (NPCs) on the nuclear envelope. By immunostaining with an antibody that recognizes a component of the cytoplasmic filaments (Nup358) of NPCs, Applicant can reconstruct NPCs on the top, side and bottom of the nucleus (FIG. 16). As with mitochondria, Applicant's approach reveals the contours of almost the entire nuclear surface, where both prominent invaginations and subtle undulations (typically visualized only by electron microscopy, EM) are apparent (FIG. 16, Panels A and B).

Revealing COPI Vesicles on Golgi Apparatus

Applicant next visualized COPI vesicles, which have traditionally been resolved only by EM as they have ~100 nm diameters and are densely packed around the Golgi cisternae. Moreover, as the Golgi complex is located close to the middle of the cell, recording high-quality data in a central z-plane is a challenging test of the instrument's 3D resolution capabilities. FIG. 17 shows the COPI β' subunit, a protein in the outer COPI complex, immunostained using ALEXA FLUOR® 647 dye in BSC-1 cells. Strikingly, Applicant visualized distinct hollow COPI-coated spheres within cells (FIG. 17, Panels B, C, E, F, and G-N). Applicant's 3D images resolve individual COPI vesicles with ~100 nm diameter, consistent with previous measurements. Additionally, a 300-nm section through a region of the Golgi shows that COPI-coated structures are packed around a 500-1000 nm (x and y) by 500 nm (z) area of a Golgi stack (FIG. 17, Panels D-F) confirming prior reports that COPI coated vesicles appear throughout the cis to trans Golgi cisternae by EM.

Revealing Ciliary Membrane GPCR Organization

Most high-resolution studies of the primary cilium, a solitary microtubule-based organelle that protrudes from the cell surface and acts as a cellular antenna, have relied on EM. A transmission EM (TEM) image typically shows only a small subsection of a cilium as the sample is a random oblique ~70-100 nm thick section through the structure, which can be up to 10 microns long and ~250 nm wide. Scanning electron microscopy (SEM) images can show an entire cilium with high resolution, however these images completely lack information about specific protein localization. Previous nanoscopy studies on cilia relied on inferring the 3D organization from 2D datasets. Here, Applicant used W-4PiSMSN to image the G-protein coupled receptor Smoothened (SMO) on whole primary cilia in hTERT-RPE1 cells with high 3D resolution (FIG. 18). SMO was tagged with a pH-sensitive GFP (pH-SMO), which was used as an epitope for antibody labeling with ALEXA FLUOR® 647 dye as depicted in FIG. 18 and further described herein. Applicant observed that overexpressed pH-SMO localizes to the membranes of cilia, which form hollow cylinders of 3-10 μm long (FIG. 18) that vary in diameter from ~280 to 160 nm (FIG. 18, Panels A-E). Applicant's W-4PiSMSN images of the ciliary membrane allow us to precisely measure the cilium's diameter along its entire length. Interestingly, Applicant found that cilia diameter is not always constant. Rather, one example cilium has a ~250 nm diameter at the base, shows an abrupt contraction of ~50 nm midway along its length, and then continues to have a ~200 nm diameter until the ciliary tip (FIG. 18, Panels C-E, Movie S5). Applicant speculates this change in diameter may correspond to the thinning of the 9+0 microtubule axoneme, which is known to transition from triplet microtubules, to doublets and eventually singlets. The ciliary tip is not narrow, but has a bulbous shape, consistent with structures observed in EM. Next, Applicant examined the local density of molecules along the ciliary membrane to identify regions with higher concentrations of pH-SMO. Higher local density is present around the base, on small bulbous protrusions, and on stripes along the cilia length (FIG. 18, Panels F-H and FIG. 14). These protrusions may be vesicles (diameter ~150-200 nm) budding from the cilia (FIG. 18, Panels F-H), as ectosomes have been reported to bud from some cilia.

Resolving Synaptonemal Complexes in Whole Mouse Spermatocytes

As a final demonstration of the capacity of Applicant's instrument to image deep into cells as thick as 10 μm, Applicant stained synaptonemal complexes in mouse spermatocyte nuclei in the pachytene phase of meiotic prophase (FIG. 19). While synaptonemal complexes have been imaged using structured illumination and 4Pi microscopy at 100-200 nm resolution, higher resolution images have been limited to chromosome spreads of <1 μm thickness. Here, with W-4PiSMSN, Applicant imaged the twisting band of lateral elements of the autosomal synaptonemal complexes. Reconstructed from a total of 126 optical sections (21 depth positions imaged in 6 repetition cycles), the entire 3D image spanned nearly 9 μm in depth and resolved SYCP3 substructure of the individual autosomal synaptonemal complexes with unprecedented clarity independent of their orientation or depth (FIG. 19, Panels A-E). Thus, Applicant's approach promises the capacity to visualize the nanoscale spatial organization of chromosomal protein complexes in the context of architectural elements of the nucleus, which are lost in chromatin spread preparations.

Discussion

Through a confluence of several technological innovations, Applicant demonstrated that W-4PiSMSN provides unprecedented access to the ultrastructure of cells with ~10-20 nm isotropic resolution throughout their entire volume. This resolution is 20-50 times higher than conventional microscopy with imaging depth improved ~10-fold over state-of-the-art iPALM and 4Pi-SMSN. This development extends the application range of 4Pi-based SMSN dramatically: imaging is no longer limited to features within small sub-volumes of cells. Instead, Applicant's invention is capable of imaging organelles that span large volumes, exemplified by the mitochondrial network, the nuclear envelope and synaptonemal complexes, which Applicant capture in virtual entirety. Thus, W-4PiSMSN is a versatile and powerful tool that promises a new perspective on how proteins distribute across entire organelles throughout whole cells, a key unmet challenge in cell biology.

In conclusion, Applicant believes that the development of W-4PiSMSN represents the culmination of more than a decade's research on high-resolution fluorescence imaging techniques and establishes 3D biological imaging with molecular specificity and resolution in the 10 nm range as a general imaging technique.

Implementation in Computer-Readable Media and/or Hardware

The methods described herein can be readily implemented in software that can be stored in computer-readable media for execution by a computer processor. For example, the computer-readable media can be volatile memory (e.g., random access memory and the like) and/or non-5 volatile memory (e.g., read-only memory, hard disks, floppy disks, magnetic tape, optical discs, paper tape, punch cards, and the like).

Additionally or alternatively, the methods described herein can be implemented in computer hardware such as an application-specific integrated circuit (ASIC).

REFERENCES (1) D. Aquino et al., "Two-color nanoscopy of three-dimensional volumes by 4Pi detection of stochastically switched fluorophores." 8 *Nat. Methods* 353-59 (2011).

(2) J. A. G. Briggs, "Structural biology in situ—the potential of subtomogram averaging," 23 *Curr. Opin. Struct. Biol.* 261-67 (2013).
(3) J. Broeken et al., "Resolution improvement by 3D particle averaging in localization microscopy," 3 *Methods Appl. Fluoresc.* 014003 (2015).
(4) G. Brostow et al., "Novel skeletal representation for articulated creatures," 3023 *Lecture Notes in Comp. Sci.* 66-78 (2004).
(5) D. Burke et al. "Adaptive optics correction of specimen-induced aberrations in single-molecule switching microscopy," 2 *Optica* 177 (2015).
(6) L. Chan et al., "Refactoring bacteriophage T7," 1 *Mol. Syst. Biol.* 2005.0018 (2005).
(7) B. M. Hanser et al., "Phase-retrieved pupil functions in wide-field fluorescence microscopy," 216 *J. Microsc.* 32-48 (2004).
(8) B. Huang et al., "Whole-cell 3D STORM reveals interactions between cellular structures with nanometer-scale resolution," 5 *Nat. Methods* 1047-52 (2008).
(9) F. Huang et al., "Simultaneous multiple-emitter fitting for single molecule super-resolution imaging," 2 *Biomed. Opt. Express* 1377-93 (2011).
(10) F. Huang et al., "Video-rate nanoscopy using sCMOS camera-specific single-molecule localization algorithms," 10 *Nat. Methods* 653-58 (2013).
(11) B. Jian & B. C. Vemuri, "Robust point set registration using Gaussian mixture model," 33 *IEEE Trans. Pattern Anal. Mach. Intell.* 1633-45 (2011).
(12) K. Klasing et al., "A clustering method for efficient segmentation of 3D laser data," in *Proc. 2008 IEEE International Conference on Robotics and Automation.* 4043-48 (2008).
(13) T. R. Judge & P. J. Bryanston-Cross, "A review of phase unwrapping techniques in fringe analysis," 21 *Opt. Lasers Eng.* 199-239 (1994).
(14) X. Li et al., "Electron counting and beam-induced motion correction enable near-atomic-resolution single-particle cryo-EM," 10 *Nat. Methods* 10, 584-90 (2013).
(15) H. C. Lim et al., "Evidence for a DNA-relay mechanism in ParABS-mediated chromosome segregation." 2014:3 *eLife* e02758 (2014).
(16) N. Olivier et al., "Resolution Doubling in 3D-STORM Imaging through Improved Buffers," 8(7) *PLoS ONE* e69004 (2013).
(17) R. Parthasarathy, "Rapid, accurate particle tracking by calculation of radial symmetry centers," 9 *Nat. Methods* 724-26 (2012).
(18) G. Shtengel et al. "Interferometric fluorescent super-resolution microscopy resolves 3D cellular ultrastructure," 106 *Proc. Natl. Acad. Sci. U.S.A.* 3125-30 (2009).
(19) C. von Middendorff et al., "Isotropic 3D Nanoscopy based on single emitter switching," 16 *Opt. Express* 20774-88 (2008).
(20) B. Wang & M. J. Booth, "Optimum deformable mirror modes for sensorless adaptive optics." 282 *Opt. Commun.* 4467-74 (2009).
(21) Y. Wang et al., "Localization events-based sample drift correction for localization microscopy with redundant cross-correlation algorithm," 22 *Opt. Express* 15982-91 (2014).

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:
1. A computer-implemented method comprising:
 (a) receiving at a super-resolution microscope a plurality of single-molecule emission events;
 (b) calculating a metric m that changes its value depending on axial positions of single molecule emission events in the plurality of single-molecule emission events detected by a super-resolution microscope, each event including an interference phase $\varphi_0$, an x and y coordinate, and a signal distribution that depends on an axial position of the single-molecule emission event;
 (c) creating a histogram or scatter plot of interference phase $\varphi_0$ over metric m;
 (d) applying a piece-wise monotonic path-finding algorithm to the histogram or scatter plot to identify a piece-wise monotonic path with respect to metric m;
 (e) unwrapping the piece-wise monotonic path into a monotonic path by adding an integer multiplication of $2\pi$ in different sections of the piece-wise monotonic path such that the piece-wise monotonic path is converted into a single-piece monotonic path;
 (f) for each of a plurality of the single-molecule emission events:
  (i) identifying a point $P_{path}$ on the single-piece monotonic path having a minimum distance to a point (m, $\varphi_0$) corresponding to the event;
  (ii) identifying an integer multiplication of $2\pi$ associated with point $P_{path}$ during the unwrapping step;
  (iii) adding the integer multiplication of $2\pi$ to the point (m, $\varphi_0$) corresponding to the event to obtain (m, $\varphi$); and
  (iv) determining an axial position of the single-molecule emission event using $\varphi$; and
 (g) generating a three-dimensional image by aggregating the plurality of single-molecule emission events, wherein the aggregation accounts for the determined axial positions, the x-position, and the y-position.
2. The method of claim 1, wherein step (e)(iv) further comprises multiplying $\varphi$ by a distance that describes a period of the single molecule emission interference pattern.
3. The method of claim 1, wherein the metric

$$m = \frac{\sigma_x^3}{\sigma_y} - \frac{\sigma_y^3}{\sigma_x}.$$

4. The method of claim 1, wherein the histogram or scatter plot is a two-dimensional histogram or scatter plot.
5. The method of claim 1, wherein the piece-wise monotonic path-finding algorithm is a piece-wise monotonic ridge-finding algorithm.
6. A non-transitory computer readable medium containing program instructions executable by a processor, the computer readable medium comprising program instructions to implement a computer-implemented method comprising:

(a) receiving at a super-resolution microscope a plurality of single-molecule emission events;
(b) calculating a metric m that changes its value depending on axial positions of single molecule emission events in the plurality of single-molecule emission events detected by a super-resolution microscope, each event including an interference phase $\varphi_n$, an x and y coordinate, and a signal distribution that depends on an axial position of the single-molecule emission event;
(c) creating a histogram or scatter plot of interference phase $\varphi_n$ over metric m;
(d) applying a piece-wise monotonic path-finding algorithm to the histogram or scatter plot to identify a piece-wise monotonic path with respect to metric m;
(e) unwrapping the piece-wise monotonic path into a monotonic path by adding an integer multiplication of $2\pi$ in different sections of the piece-wise monotonic path such that the piece-wise monotonic path is converted into a single-piece monotonic path;
(f) for each of a plurality of the single-molecule emission events:
  (i) identifying a point $P_{path}$ on the single-piece monotonic path having a minimum distance to a point (m, $\varphi_0$) corresponding to the event;
  (ii) identifying an integer multiplication of $2\pi$ associated with point $P_{path}$ during the unwrapping step;
  (iii) adding the integer multiplication of $2\pi$ to the point (m, $\varphi_0$) corresponding to the event to obtain (m, $\varphi$); and
  (iv) determining an axial position of the single-molecule emission event using $\varphi$; and
(g) generating a three-dimensional image by aggregating the plurality of single-molecule emission events, wherein the aggregation accounts for the determined axial positions, the x-position, and the y-position.

7. A super-resolution microscope comprising:
a first opposing objective lens;
a second opposing objective lens;
a camera in optical communication with the opposing objective lenses;
a beam combiner in optical communication with both:
  a first optical path from the first opposing objective lens; and
  a second optical path from the second opposing objective lens;
the beam combiner adapted and configured to combine the first optical path and the second optical path; and
a controller programmed to implement a computer-implemented method comprising:
  (a) receiving at a super-resolution microscope a plurality of single-molecule emission events from the camera;
  (b) calculating a metric m that changes its value depending on axial positions of single molecule emission events in the plurality of single-molecule emission events detected by a super-resolution microscope, each event including an interference phase $\varphi_0$, an x and y coordinate, and a signal distribution that depends on an axial position of the single-molecule emission event;
  (c) creating a histogram or scatter plot of interference phase $\varphi_0$ over metric m;
  (d) applying a piece-wise monotonic path-finding algorithm to the histogram or scatter plot to identify a piece-wise monotonic path with respect to metric m;
  (e) unwrapping the piece-wise monotonic path into a monotonic path by adding an integer multiplication of $2\pi$ in different sections of the piece-wise monotonic path such that the piece-wise monotonic path is converted into a single-piece monotonic path;
  (f) for each of a plurality of the single-molecule emission events:
    (i) identifying a point $P_{path}$ on the single-piece monotonic path having a minimum distance to a point (m, $\varphi_0$) corresponding to the event;
    (ii) identifying an integer multiplication of $2\pi$ associated with point $P_{path}$ during the unwrapping step;
    (iii) adding the integer multiplication of $2\pi$ to the point (m, $\varphi_0$) corresponding to the event to obtain (m, $\varphi$); and
    (iv) determining an axial position of the single-molecule emission event using $\varphi$; and
  (g) generating a three-dimensional image by aggregating the plurality of single-molecule emission events, wherein the aggregation accounts for the determined axial positions, the x-position, and the y-position.

* * * * *